United States Patent
Gulati et al.

(10) Patent No.: US 11,361,018 B2
(45) Date of Patent: Jun. 14, 2022

(54) AUTOMATICALLY CURATED IMAGE SEARCHING

(71) Applicant: ADOBE INC., San Jose, CA (US)

(72) Inventors: Samarth Gulati, San Francisco, CA (US); Brett Michael Butterfield, San Francisco, CA (US); Baldo Faieta, San Francisco, CA (US); Kent Andrew Edmonds, San Jose, CA (US)

(73) Assignee: Adobe Inc., San Jose, CA (US)

( * ) Notice: Subject to any disclaimer, the term of this patent is extended or adjusted under 35 U.S.C. 154(b) by 795 days.

(21) Appl. No.: 15/824,907

(22) Filed: Nov. 28, 2017

(65) Prior Publication Data

US 2019/0163768 A1    May 30, 2019

(51) Int. Cl.
*G06F 16/532* (2019.01)
*G06F 16/54* (2019.01)
(Continued)

(52) U.S. Cl.
CPC ............ *G06F 16/532* (2019.01); *G06F 16/54* (2019.01); *G06F 16/56* (2019.01); *G06F 16/583* (2019.01);
(Continued)

(58) Field of Classification Search
CPC ........ G06F 16/532; G06F 16/54; G06F 16/56; G06F 16/583; G06F 16/5838; G06F 16/9535
See application file for complete search history.

(56) References Cited

U.S. PATENT DOCUMENTS 8,345,982 B2    1/2013  Gokturk et al.
8,495,057 B2 *  7/2013  Palermiti, II ........ G06K 9/6253
                                                707/722
(Continued)

FOREIGN PATENT DOCUMENTS

WO    WO-2016142285 A1 *  9/2016  ............. G06F 16/50

OTHER PUBLICATIONS

Non-Final Office Action dated Oct. 22, 2019 in U.S. Appl. No. 15/824,836, 28 pages.
(Continued)

*Primary Examiner* — Taelor Kim
(74) *Attorney, Agent, or Firm* — Shook, Hardy & Bacon LLP

(57) ABSTRACT

Systems and methods for searching digital content are disclosed. A method includes receiving, from a user, a base search constraint. A search constraint includes search values or criteria. A recall set is generated based on the base search constraint. Recommended search constraints are determined and provided to the user. The recommended search constraints are statistically associated with the base search constraint. The method receives, from the user, a selection of a first search constraint included in the plurality of recommend search constraints. The method generates and provides search results to the user that include a re-ordering of the recall set. The re-ordering is based on a search constraint set that includes both the base search constraint and the selected first search constraint. The re-ordering is further based on a weight associated with the base search constraint and another user-provided weight associated with the first search constraint.

20 Claims, 10 Drawing Sheets

(51) Int. Cl.
*G06F 16/56* (2019.01)
*G06F 16/583* (2019.01)
*G06F 16/9535* (2019.01)

(52) U.S. Cl.
CPC ...... *G06F 16/5838* (2019.01); *G06F 16/9535* (2019.01)

(56) References Cited

U.S. PATENT DOCUMENTS

| | | | |
|---|---|---|---|
| 8,751,530 B1 | 6/2014 | Ioffe | |
| 9,280,565 B1 | 3/2016 | Rizk et al. | |
| 2007/0168357 A1 | 7/2007 | Mo | |
| 2008/0077570 A1* | 3/2008 | Tang | G06F 16/3346 |
| 2011/0029561 A1 | 2/2011 | Slaney et al. | |
| 2011/0099191 A1 | 4/2011 | Ghosh et al. | |
| 2011/0179021 A1* | 7/2011 | Wen | G06F 16/58 |
| | | | 707/723 |
| 2012/0201468 A1 | 8/2012 | Oami et al. | |
| 2014/0022265 A1* | 1/2014 | Canan | G09G 5/003 |
| | | | 345/522 |
| 2014/0280180 A1 | 9/2014 | Edecker et al. | |
| 2015/0287162 A1* | 10/2015 | Canan | G09G 5/003 |
| | | | 345/522 |
| 2015/0324366 A1* | 11/2015 | Becker | G06F 16/313 |
| | | | 707/706 |
| 2016/0224593 A1 | 8/2016 | Qiu et al. | |
| 2017/0249339 A1 | 8/2017 | Lester | |
| 2018/0032581 A1 | 2/2018 | Baldeschi et al. | |
| 2018/0089556 A1 | 3/2018 | Zeiler et al. | |
| 2018/0189325 A1 | 7/2018 | Hohwald et al. | |

OTHER PUBLICATIONS

Final Office Action dated Feb. 25, 2020 in U.S. Appl. No. 15/824,836, 38 pages.
Non-Final Office Action dated Jun. 2, 2020 in U.S. Appl. No. 15/824,836, 41 pages.
Final Office Action dated Oct. 8, 2020 in U.S. Appl. No. 15/824,836, 15 pages.
Notice of Allowance dated Jan. 21, 2021 in U.S. Appl. No. 15/824,836, 7 pages.

* cited by examiner

AUTOMATICALLY CURATED IMAGE SEARCHING

BACKGROUND

A growth rate for the volume of digital content collections is sometimes referred to as content velocity. For many forms of digital content, the content velocity and resulting content volume is significant. As an example, the ubiquity of camera-enabled mobile devices has enabled a staggering content velocity and content volume for private, as well as shared and/or public collections of digital images. Searching for relevant content within such voluminous collections is challenging.

Complex and/or highly dimensional content exacerbates such search challenges. For instance, searching over large collections of complex and highly dimensional digital content, such as digital images, is notoriously difficult at least because users may find it difficult to structure a search query adequately targeted to their specific search interests. As an example, when attempting to search for an image depicting a scene of interest, a user may provide a conventional search system with a natural language phrase that somewhat describes the scene of interest. However, in providing such a search phrase, the user may under or over constrain the search via the inclusion of too few or too many descriptor words. The resulting search results may be too broad or too narrow to be of value.

Additionally, due to the relatively high frequency of synonyms and antonyms in natural languages, such as English, as well as the inherent ambiguity of natural languages, constructing a natural language phrase that is consistent with keywords employed to characterize the images within the search system may be difficult. That is, the user's search phrase may not describe the scene of interest in terms that are consistent with the search system. For example, a user may provide the search phrase "smiling baby," when interested in images of smiling babies. However, within an image database, images of smiling babies may be characterized via keywords such as "happy" and "infant," rather than "smiling" and "baby." In such a scenario, the search system may return a null, or at least an overly narrow, set of search results. A user may expend significant manual effort updating their search phrases to find a phrase that is consistent with the system's characterization of images and that generates search results consistent with their search interests.

SUMMARY

Embodiments of the present invention are directed towards enhanced systems and methods for searching digital content, such as but not limited to digital images. One such method includes receiving, from a user, a base search constraint for the content. A search constraint includes search values or criteria. A plurality of recommended search constraints may be determined and/or generated and provided to the user. At least some of the plurality of recommended search constraints may be statistically associated with and/or related to the base search constraint. The method may receive, from the user, a selection of a first search constraint included in the plurality of recommend search constraints. The method generates and provides search results to the user. The search results are based on a search constraint set that includes both the base search constraint and the selected first search constraint.

In some embodiments, the method further includes generating and/or determining a recall set of the content based on the base search constraint and updating the recall set based on the first search constraint. For instance, the recall set may be initial or preliminary search results, and the preliminary search results are re-ordered and/or re-ranked based on the received first search constraint. In some embodiments, updating the recall set may be based on a weight associated with the base search constraint and another weight associated with the first search constraint. The search results that are provided to the user are based on the updated recall set.

In various embodiments, the weight associated with the first search constraint is received from the user. In other embodiments, the weight associated with the base search constraint may be a default or maximum weight. The user may or may not be enabled to modify the weight associated with the base search constraint. The recall set may be ordered based on the base search constraint, the weight associated with the base search constraint, the first search constraint, and the weight associated with the first search constraint. The search results provided to the user are based on the order of the recall set.

In at least one embodiment, a selection of a first image is received from the user. The first image may be included in the search results or the user may alternatively provide the first image via other means. A value indicating an aspect of the first image is determined. At least one of the recommended search constraints is based on the value indicating the aspect of the first image. The aspect of the first image may be a color depicted in the first image, content (such as but not limited to tangible objects such as persons, physical objects, locations, and the like), or an aesthetic quality of the image. Such image aesthetic qualities may include one or more of the hue, saturation, lightness, intensity, quantity, color harmony, depth of field, interesting content, interesting lighting, motion blur, out-of-focus blur (e.g., image bokeh), object emphasis, quality, or repetition of the first image.

DETAILED DESCRIPTION

Figure 1:
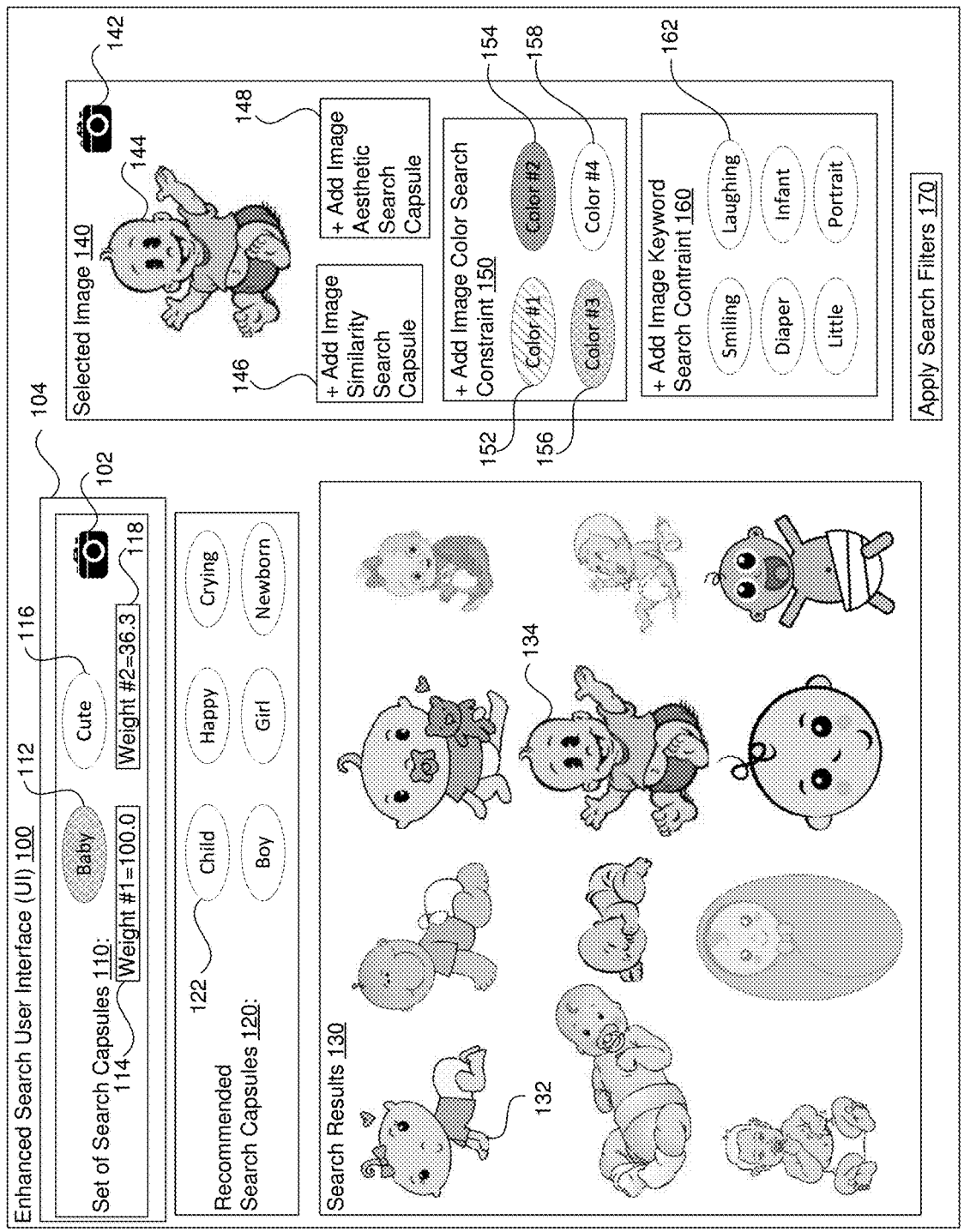
FIG. 1 illustrates an enhanced search user interface for implementing various embodiments presented herein.

Briefly stated, various embodiments are directed towards enhanced systems and methods for searching for digital images of interest based on multiple search constraints that are arranged in a set of search constraints, i.e., a search constraint set. The various embodiments curate and/or guide the search process by automatically generating and providing recommended search constraints based on at least a portion of the search constraints included in the search constraint set and/or one or more user-selected example images. The user may provide a prioritization weight for each search constraint included in the search constraint set. Such prioritization weights can then be used to generate more desirable recommended search constraints.

More specifically, the embodiments are directed to enhanced search methods and paradigms the employ combining weighted search constraints. The combining of the search constraints and recommending search constraints is based on embedding the search constraints and the searchable images within a vector space. By recommending search constraints and implementing adjustable weights, the various embodiments translate the user's search interests, as encoded in examples of images of interest and natural language keywords/phrases, into search constraint values that are related to image aspects. Such image aspects may be automatically classified and/or quantified via various machine-vision and other machine learning methods As used herein, a "search constraint" may include one or more search criteria, search conditions, or search query values. The criteria, conditions, or values may be textual and/or numerical. The search constraints may also include one or more examples of items of digital content of interest. Thus, search constraints include, but are not limited to, a keyword or a natural language phrase that describes various properties, features, or characteristics of the type of digital content being searched.

Search constraints may include one or more textual and/or numerical values indicating one or more properties, characteristics, or features of interest of the type of digital content being searched. Any property, characteristic, or feature of an item of digital content may herein be collectively referred to as an aspect of the digital content. Thus, a search constraint may include any textual or numerical value or quantity that encodes an aspect of the digital content being searched. As discussed throughout, a search constraint may include an example of the type of digital content for a similarity search or search by example. As discussed throughout, a search constraint may be mapped or correspond to a position or location within a vector space. The searchable images may be embedded within the vector space based on aspects of the image. Thus, a distance between a vector representation of an image and a vector representation of the search constraint may be employed to determine a relevancy score for the image for the search constraint.

A "search constraint type" may refer to the type of value that is included in the search constraint. In general, search constraint types include, but are not limited to keyword search constraints types, image similarity search constraint types, color search constraint types, image aesthetic search constraint types, and the like. More specific to embodiments directed towards searching digital images, search constraint types for may include textual search constraints such as natural language keywords, strings of keywords, search phrases, and the like that refer to various aspects of images, such as persons, objects, locations, and/or scenes depicted in images. Other search constraints types may include, but are not limited to individual and/or combinations of example images (e.g., search by example and/or image similarity search constraints), individual and/or combinations of colors depicted within the images, and various aesthetic properties of images, such as but not limited to hue, saturation, lightness, intensity, quantity, and such. In embodiments that additionally and/or alternatively search forms of digital content other than digital images, other types of search constraints may be employed, such as genre-related search constraints, as well as artist-related search constraints for video/audio digital content, audio similarity search constraints, and the like.

Searching for digital images of interest is typically challenging. In conventional image search systems, the user often describes, via natural language keywords and/or search phrases, various image aspects of interests. Due to the numerous synonyms, antonyms, and inherent ambiguities included in many natural languages, matching a natural language search phrase to a digital image of interest often proves challenging. For instance, in conventional systems, it may be difficult to describe, via a natural language mechanism, the various image aspects of interest.

To overcome such difficulties associated with natural languages, and in contrast to conventional systems, the various embodiments herein curate and/or guide the search process by automatically generating and providing recommended search constraints (e.g., values for machine-vision related quantities and keywords). The recommended search constraints are based on statistical associations and/or relationships with natural language keywords and phrases, as well as example images of interest that the user has provided and/or selected. Determining recommended search constraint may be based on the locations or positions of the search constraints within the vector space. For instance, if the user provides a first search constraint that is mapped to a first location in the vector space, determining a recommended search constraint may be based on the first location and a second location of the recommended search constraint.

The recommend search constraints may be selected and combined with other search constraints (e.g., user input) to generate a search constraint set used to search digital images. A relative prioritization of each search constraint included in the search constraint set may be provided via weights associated with the search constraints. More specifically, the embodiments may automatically generate recommended search constraints (such as but not limited to keywords, image aesthetic values, color values, and other indicating various image aspects) for a digital image search. The automatically generated recommended search constraints may be based on one or more other search constraints, as well as aspects of example digital content items. For instance, the various embodiments may determine recommended search constraints, in the form of one or more values associated with various machine-vision models, based on a statistical association with natural language keywords, phrases, or example images included in the search constraint set. Such automatically generated recommended search constraints may be provided to the user. The user may select one or more of the automatically generated recommended search constraints to add to the search constraint set. As such, the search process is at least partially automatically curated and/or guided. That is, the various embodiments guide the searching process via the automatic translation of natural language keywords and phrases, as well as aspects of example images, into recommended search constraints that include statistically related values associated with the examples provided by the user.

Search results are iteratively generated and/or updated as the search constraint set is updated or modified to include combinations of user provided search constraints, as well as automatically generated search constraints that are selected by the user. Weights associated with each search constraint included in the search constraint set may be provided and/or adjusted by the user. The search results are updated based on the weights of the search constraints. For example, the search results may be prioritized, ranked, or ordered based on the weights of the individual search constraints included in the search constraint set.

An intuitive, enhanced search user interface (UI) is provided that enables the user to provide search constraints and associated weights, as well as view the updated search results in real-time (or near real-time) as search constraints are added, deleted, or modified. The user may employ the enhanced UI to view, select, and modify/edit the recommended search constraints and the search constraint set. The user may also employ the UI to apply various filters to the search results, as well as save, share, and open saved search constraint sets and search results.

Each image included in a searchable database may be associated with various forms of metadata. The image and/or the metadata may be stored as a database record, such as enhanced image database record 320 of FIG. 3B. Briefly, the image metadata may include any automatically generated and/or manually provided data that encodes, or otherwise indicates virtually any aspect of the image. The persons, objects, locations, and scenes depicted within an image may be herein collectively referred to as the content of an image. Metadata may encode any aspect of an image, including but not limited to the content of the image. Metadata may additionally encode the position of the content within an image (e.g., whether content is in the foreground/background of the image, at least an approximate pixel mapping of the location of the content, which quadrant of the image various content is located within, and the like).

Metadata may encode the aspects of an image via natural language textual metadata (such as but not limited to tags, annotations, keywords, phrases, and captions), as well as numerical values or quantities. For instance, metadata associated with an image may include textual metadata such as various keyword tags associated with the content depicted within an image, e.g., metadata associated with an image depicting a baby may include a keyword tag "baby." The metadata may encode the distribution of the various colors and greyscales depicted in the pixels of the image, e.g., color metadata. Metadata may encode values for various image aesthetics of the image, such as but not limited to hue, saturation, lightness, intensity, quantity, color harmony, depth of field, interesting content, interesting lighting, motion blur, out-of-focus blur (e.g., image bokeh), object emphasis, quality, repetition, and the like. Metadata may also encode various objective aspects of the image, such as a timestamp or geo-location of when/where the image was generated.

At least a portion of the associated metadata may be employed to embed an image within a vector space, where the basis vectors of the vector space are based on the detectable aspects of the image. Each image may be indicated, represented, or encoded as a vector within the vector space. The components of an image's vector representation may correspond to the aspects of the image. Furthermore, each search constraint discussed herein may correspond to one or more locations or positions within the vector space. Each search constraint may be represented as a vector within the vector space. Accordingly, for each search constraint, a relevancy score for a searched image may be determined.

The relevancy score may be based on the image's position within the vector space in comparison to the search constraint's position within the vector space. For example, the image's relevancy score for that search constraint may be based on a distance between the image's vector representation and the search constraint's vector representation. The distance may be encoded in a determined distance metric Such non-limiting examples of distance metrics include sum of absolute differences, sum of squared differences, mean absolute error, mean squared error, Euclidean distance, Manhattan distance, Chebyshev distance, Minkowski distance, and the like. In at least one embodiment, the determination of the distance metric is isolated to a portion of the dimensions of the vector space. For instance, the distance between any two images, for an image similarity search, may be determined based on a particular set of 10 of the 1000 dimensions of the vector space. In at least some embodiments, a user is enabled to select the subset or portion of the dimensions into which to calculate the similarity metric based on the distance between the example image and the search images. In other embodiments, the between an image and a search is determined based on all the dimensions of the vector space. The metadata may encode the vector representation of an image.

The aspects of an example image, as well as images included in a searchable database, may be determined via various machine-vision or other automated image analysis methods. An image classifier, such as but not limited to enhanced image classifier 300 of FIG. 3A, may classify aspects of an image, via machine learning, machine-vision, image analysis, or other automated methods, and encode such classifications in metadata. That is, aspects of images included in searchable databases, as well as any example images, may be determined via various machine-learning methods employed by an image classifier. Supervised and unsupervised learning may be employed to generate classification models that detect, determine, and/or classify the various image aspects. For instance, various forms of machine-vision (such as but not limited to deep-learned convolutional neural networks) may be employed to determine content depicted within images, as well the placement of the content and values for various colors depicted with an image and aesthetic properties of the image.

The recommended search constraints may be determined based on statistical associations and/or relationships with one or more other search constraints, as well as the properties, characteristics, or features of example digital content items. Such statistical associations and/or relationships may include correlations, variances, covariances, and the like. For instance, if a user provides the keyword search constraint "infant," the various embodiments may recommend additional search constraints statistically associated with and/or related to an infant, such as but not limited to keyword search constraints: "baby," "boy," "girl," "crying," "happy," "sad," "smiling," and the like, as these keywords are statistically associated with the keyword "infant." Likewise, if a user selects an image depicting an infant as an example image for an image similarity search constraint, the various embodiments may recommend additional search constraints statistically associated with the infant depicted in the image, e.g., keyword search constraints: "baby," "boy," "girl," "crying," "happy," "sad," "smiling," and the like. Additionally, the embodiments may recommend values for the various image aesthetics of the example image, and/or the dominant colors depicted within the image, as additional search constraints.

The enhanced systems and methods provide and/or recommend search constraints that are likely to constrain a search in a manner that is consistent with the user's search interests, via such statistical associations and relationships. That is, the various embodiments automatically translate the users search interests, as indicated via other (textual and/or numerical) search constraints or example images into additional search constraints, including values for image aspects that are statistically associated with the provided search constraints. As such, the automatically determined search constraints are likely-relevant to the user's search interests. Furthermore, such statistical associations may be determined via various statistical models, including but not limited to trained and/or untrained machine-learning models. Thus, the various embodiments may "learn" associations between search constraints, as well as the image aspects based on the actions of users within a conventional or enhanced searching system or platform, as well as other multi-user systems or platforms. Accordingly, such statistical associations are employed to efficiently and automatically guide (and/or curate) a search in a manner that is likely to result in search results that are more consistent with the user's search interests than the search results associated with conventional search engines.

Additionally, via the automatic recommendation of search constraints provided via the enhanced search UI, the embodiments guide the user in iteratively refining the search constraint set, in an efficient and intuitive manner. The statistical associations and/or relationships employed to determine recommended search constraints may be determined by a statistical analysis component and/or module, such as but not limited to statistical analysis component 370 of FIG. 3C. Such a statistical analysis component may employ various statistical models, including but not limited to trained and/or untrained machine-learning models to determine the statistical associations and/or relationships.

In contrast to the herein embodiments, conventional search engines may not recommend search constraints based on other search constraints. Likewise, conventional search engines may not recommend search constraints based on the various aspects of example digital content items. Such conventional search engines may require the user to manually determine and provide multiple search constraints. That is, conventional search engines may not employ the statistical associations between multiple search constraints and/or features of content items to determine additional search constraints. For instance, in a conventional image search engine, the user may provide the keyword search criteria "baby." The conventional search engine may return multiple images depicting babies. Some of the depicted babies may be boys, while others are girls. Some of the depicted babies may be crying indicating an emotion of sadness or distress, while other babies appear to be happy or smiling. Upon manual inspection of the search results, the user may determine a search preference for babies that are smiling. The user may update the search query to include the natural language phrase: "smiling babies." The conventional search engine may then return one or more images depicting smiling babies.

For the various embodiments employed herein, upon initially receiving a keyword search constraint, such as but not limited to "baby," the embodiments may automatically provide additional recommended search constraints that are statistically associated with the keyword "baby." For instance, without requiring the generation of search results and/or the user manually inspecting such search results, the various embodiments may automatically provide additional recommended search constraints such as, but no limited to the keyword constraints: "infant," "boy," "girl," "crying," "happy," "sad," "smiling," based on the statistical associations with the keyword search constraint "baby."

At least because additional search constraints may be recommended and selected without the need to generate and/or manually inspect search results, various technological improvements to computer-related technologies (e.g., the searching of digital content) are provided herein. That is, statistically likely relevant (with respect to the user's search interests) search constraints may be generated and provided, without requiring the generation and/or manual inspection of search results. Because the recommended search constraints are statistically likely relevant to the user's search interests, the various embodiments efficiently provide automated guidance and/or curation for the generation of a useful combinations of relevant search constraints.

Furthermore, such conventional systems may not enable the user to provide weights for individual search constraints, such that the search results are prioritized based on a user-provided weighting or priority of the individual search constraints. Thus, search results provided via a conventional search engine may not prioritize the search results in a manner consistent with the priorities of the user's search interests. For example, in a conventional search engine, the user may provide the natural language search phrase: "smiling baby boy." However, the user may desire a prioritization of the image property of "smiling," over the image property of "boy." Such conventional search engines may not provide the user a mechanism to assign relative weights to the various properties being searched. In contrast, in the embodiments herein, the user may assign relative weights to the keyword search constraints: "smiling," and "boy." The search results are generated and/or updated based on the relative weights of each of the search constraints. For instance, the search results may be ranked or ordered based on the user-provided weights.

Furthermore, due to the relatively high frequency of synonyms and antonyms in natural languages, such as English, as well as the inherent ambiguity of natural languages, constructing a natural language phrase that is consistent with vocabulary or keywords employed to characterize digital content via a conventional search engine may be difficult. When interested in images of smiling babies, a user may provide the natural language search phrase: "smiling baby," to a conventional search engine. However, within an image database, images depicting smiling babies may be characterized via similar, but non-equivalent keywords such as "happy," "infant," or other vocabulary words, rather than "smiling" and "baby." A conventional search engine may return a null, or at least an overly narrow set of search results. A user may expend significant manual effort updating their search phrases to find natural language phrases that are consistent with the vocabulary employed to characterize images within any particular database.

In contrast to these conventional search engines, images included in a searchable database herein may be associated with multiple keywords, natural language phrases, properties, features, or characteristics based on statistical associations discussed above. That is, in the various embodiments, an image depicting a baby may be associated with multiple keywords (via metadata) of similar (but non-equivalent) semantics, such as but not limited to "baby," "infant," "newborn," and the like due to the above discussed statistical associations. Additionally, because the various embodiments determine and provide additional search constraints that are statistically associated with other search constraints, when a user provides the search constraint "baby," other keyword search constraints associated with images that are likely relevant to the user's search interests, such as "infant," "newborn," "crying," and "happy" may be automatically recommended. Thus, the user may not inadvertently overly limit or constrain the search results based on their choice (or non-choice) of preferred similar search constraints or searching biases.

As noted above, in addition to keywords, search constraints may include, but are not limited to, values indicating aspects of an example image. That is, the various embodiments employ methods of search by similarity based on a similarity (or "distance") between an aspect of example digital content and the corresponding aspects of digital content items included in searchable databases. As noted throughout, each image may be embedded within a vector space, based on the aspects of the image. In one example, a user may select an example image from the current search results or otherwise provide an example image. Various user-selected aspects of the example image may be employed as a search constraint.

Additional and/or alternative search constraints may be automatically generated and recommended based on the various aspects of the example image. That is, an image similarity search may be recommended to the user. Such recommended search constraints may be directed towards the content depicted within the image, the various colors or greyscales depicted in the image, or various aesthetics of the image. For instance, based on a selected example image depicting a baby, an enhanced system may generate and recommend various keywords associated with a baby, as well as the dominant colors and aesthetic values of the example image.

Supervised and/or unsupervised machine learning, such as but not limited to clustering analysis and natural language processing (NLP) models, may be employed by a statistical analysis component or module to generate and/or determine the statistical associations between the aspects of images and potential search constraints to recommend. In embodiments, various forms of learned clustering analysis may employed to determine statistical associations (such as but not limited to variances, covariances, correlations, and the like) between various keywords, image aspects, image aesthetic values, colors depicted in images, content depicted in images, and the like. For instance, word embedding models, such as but not limited to Word2Vec, may be employed to determine keywords statistically associated with persons/objects/locations/scenes depicted within an image. As an example, a word-embedding model may generate a statistical association between keywords, such as "baby," "cute," and "newborn," "crying," "happy," "smiling," and the like. In some embodiments, at least a database, such as but not limited to a database including synonyms and antonyms (e.g., a thesaurus database) may be consulted to generate the statistical associations. The statistical associations may include a semantic similarity and/or difference, as well as a contextual similarity and/or difference. Other word-embedding models and/or other forms of cluster analysis may be employed to generate such associations.

As noted above, many embodiments discussed throughout are directed towards searching digital images. However, other embodiments are not so limited, and such embodiments may be employed to search any form of digital content, such as but not limited to digital audio (music and/or speech) content, video content, textual documents, multimedia content, and the like. It should be understood how other various forms of machine-learning methods may be employed to determine the various aspects of digital content other than images, as well as generate the statistical associations between multiple search constraints and the properties, characteristics, and features of other forms of digital content.

In one non-limiting embodiment, a user may provide an initial (or base) search constraint, such as but not limited to a keyword or an example image. The empty search constraint set is updated to include the base search constraint. The systems and method may generate initial search results, i.e., a recall set of images, based on the base search constraint. The systems and methods may generate and provide additional recommended search constraints that are associated with, or at least based on, the base search constraint, a user-selected image from the search results, or an additional image provided by the user. That is, the various embodiments may recommend search constraints based on other search constraints, as well as properties, characteristics, or features of selected digital content items. Such recommended search constraints may include additional keywords associated with the base search constraint or selected/provided image, colors depicted in the selected/provided image, aesthetic values associated with the selected/provided image, and the like.

The user is enabled to select one or more of the recommended search constraints, and the selected one or more recommend search constraints may be added to the search constraint set, such that the updated search constraint set now includes the base search constraint and the one or more selected recommended search constraints. The search results are updated based on the updated search constraint set. For example, the recall set may be re-ordered, filtered, or expanded based on the one or more selected recommended search constraints, as well as the base search constraint. Additional recommended search constraints may be generated and provided to the user based on one or more search constraints included in the search constraint set, a user-selected image included in the updated search results, or an image provided by the user. The search constraint set and the search results may again be updated based on the user's selection of the additionally recommended search constraints. Accordingly, the search constraint set may be iteratively updated to include additional and/or alternative search constraints based on the recommendations of the enhanced systems and methods.

In general, the embodiments discussed herein generate search results such that content that is relevant to the search constraints associated with higher weight values are more highly ranked than content that is relevant only to the search constraints associated with lesser weight values. In some embodiments, the weight associated with a search constraint may be adjusted within a pre-defined range or scale. For example, a weight value may be constrained between a maximum and a minimum value, such as but not limited to +100.0 and −100.0. For instance, content that is highly relevant to the search constraints associated with negative weight values are ranked lower than content that is relevant to the search constraint associated with positive weight values or negative weight values closer to 0.0. The weight values may be constrained to virtually any defined scale or range and need not include negative values.

FIG. 1 illustrates an example of an enhanced search user interface (UI) 100 for implementing various embodiments presented herein. UI 100 may be similar to enhanced search UI 228 of FIG. 2, or any other search UI discussed herein. UI 100 may be provided to a user via an enhanced search client, such as but not limited to enhanced search client 226 of FIG. 2. As discussed throughout, UI 100 may enable a user to interact with an enhanced search engine, such as but not limited to enhanced search engine 224 of FIG. 2 and/or enhanced image search engine 350 of FIG. 3C. That is, a user may employ UI 100 to provide one or more search constraints, as well as view and select one or more recommended search constraints to add to the search constraint set. The user may be provided with and view the search results based on the search constraint set, as well as select search results to further update the search constraint set.

In the various embodiments, a search constraint may be referred to as a "search capsule," or simply a "capsule," because a search constraint may be graphically represented within UI 100 in a form that is similar to, or resembling a capsule. For instance, each of keyword search constraints: "baby" 112, "cute" 116, and "child" 122 resembles a capsule. Accordingly, the search constraint set may be interchangeably referred to as a set of search capsules, search capsule set, or the set of search constraints. When the search constraint includes a keyword, the search constraint/capsule may function similar to a keyword/phrase filter and/or a "hashtag" filter (e.g., "#").

More specifically, a search constraint may include at least one of a search constraint type and a search constraint value. The search constraint type may include but is not limited to a keyword, a natural language phrase or text, image similarity, color, various aesthetic types, or various objective properties or characteristics of digital content, such as but not limited to an image. A search constraint type may include any type of metadata or otherwise characterize and/or classify data associated with an item of digital content. As such, objective properties of an image may include but are not limited to a geolocation or date/time that the image was generated at or on, the photographer/author/artist that generated the image, a specific camera device and/or camera device configuration or setting that was used to generate the image, or the like.

A search constraint value may be a value corresponding to the type of the search constraint. A search constraint value may be a numerical value or a natural language value such as a token or sequence of tokens (i.e., a natural language phrase). In various embodiments, a search constraint value may include an indication of a sample or example digital content, e.g., a link or a path to a file that includes the sample digital content. In some embodiments, the search constraint type and the search constraint value may serve as a field-value pair, where the search constraint type is the field and the search constraint value is the value of the field-value pair. For instance, if the search constraint type is keyword, the search constraint value may be a value for the keyword, such as "baby," child," "diaper," and the like.

For image similarity or search by example search constraints, the search constraint value may include an indication of the example image for the similarity analysis, e.g., a path or link to a file that includes the example image. If the search constraint type is color, then the corresponding search constraint value may be a value for the color. In some embodiments, the value may any value that encodes a color, such as but not limited to a hexadecimal color code, an RGB color code, a grayscale color code, or any other code that represents a color/grayscale for a pixel. If the search constraint type is image similarity, the search constraint value may be an image, an image file, a location of an image/image file, a link to the image/image file, a thumbnail of the image, or the like. For instance, the search constraint value may be the hexadecimal value of #dee510 encoding a specific shade of yellow. If the search constraint type is a type of aesthetic, such as but not limited to hue, saturation, lightness, intensity, or quantity, the search constraint value may be a numerical value indicating the value for the relevant hue level, saturation level, lightness level, or quantity level. If the search constraint type is a natural language phrase, the corresponding search constraint value may be "cute baby wearing a diaper."

In some embodiments, a search constraint may include additional search constraint values that further constrain or limit the search constraint type and/or the search constraint value. For example, if the search constraint type is color, then additional search constraint values may include one or more values for a dominance for the color. A dominance may include a minimum and/or a maximum for an absolute or relative number of the image pixels to be of or similar to the color defined via the search constraint value. For instance, additional search constraint values may include the relative range of 20%-50%. If the search constraint type is image similarity, then additional search constraint values may include one or more dimensions along which to determine a distance between the image included in the search constraint value and an image in the searched database. Additional search constraint values may indicate the similarity dimensions, such as but not limited to color values of the image, various aesthetic values of the image, or dimensions associated with machine vision, such as objects, persons, scenes, or locations depicted in the image. The examples of search constraint types and associated search constraint values discussed herein are non-limiting, and additional search constraints types/values may be employed in the various embodiments discussed throughout.

Returning to FIG. 1, UI 100 includes a visual representation or indication of the set of search constraints, e.g., set of search capsules 110. The visual representation of the set of search capsules 110 may be embedded within a search bar (or search box) 104, or other such editable search interface, as shown in FIG. 1. The set of search capsules 110 includes visual representations of two keyword type search constraints: "baby" 112 and "cute," 116, as well as a visual representation of the weights associated with each search constraint: "weight #1" 114 (associated with search constraint 112) and "weight #2" 118. In various embodiments, in order to provide search constraints, such as but not limited to keyword search constraints 112/116, the user may directly type keywords and/or natural language phrases into the search box 104. The user may have provided, adjusted, and/or modified the weights via UI 100.

As discussed throughout, weights 114/118 may include a numerical value. In some embodiments, the weight value may be constrained between a maximum and a minimum numerical value. In some embodiments, weights may be constrained to include numerical values in the range of [−100, +100]. Other embodiments may include alternative ranges for weights 114/118, such as but not limited to [−1.0, +1.0], [0, +100], [0.0, +1.0], and the like.

As shown in FIG. 1, the user has set the value of weight #1 114 to be 100.0 and the value of weight #2 118 to be 36.3. UI 100 may include a mechanism, such as but not limited to one of a slider bar, text box, or the like that enables the user in actively modifying the weight values associated with at least a portion of the search constraints. The add image button 102 enables the user to directly provide an image to be used as an example image for an image similarity (or search by example) search constraint. The user may concatenate an unlimited number of search constraints within the set of search capsules 110.

An initial search constraint, such as but not limited to keyword type search constraint 112, may be a base search constraint, i.e., the initial user-provided search constraint. That is, the user may have initially typed (or spoken) the keyword "baby" directly into a search box 104 (or a microphone coupled to UI 100), and the keyword was automatically transformed into a capsule representation, as shown in FIG. 1. Upon receiving the base search constraint 112, initial search results (e.g., a recall set) is generated based on base search constraint 112. The recall set may be provided to the user via search results box 130. In FIG. 1, search results box 130 is shown providing search results, including multiple images, based on the base search constraint "baby" 112. For instance, the provided search results include image 132 and image 134.

In some embodiments, the weight associated with the base constraint defaults to a maximum weight value, such as but not limited to 100.0. In some embodiments, the user may be enabled to adjust a default weight value associated with the base search constraint. In other embodiments, the user is not enabled to adjust the weight value associated with the base search constraint from the default value.

Also upon receiving base search constraint 112, one or more statistically associated keyword search constraints may be automatically determined based on the base search constraint 112. The recommended search capsule box 120 may be populated by the automatically determined search constraints. For example, the recommended keyword search constraint "child" 122, which is statistically associated with keyword base search constraint "baby" is shown in recommended search capsule box 120. Additional recommended keyword search constraints statistically associated with keyword "baby" are shown populating the recommended search capsule box 120. As shown in FIG. 1, similar to the user-provided search capsules, the recommended search constraints may be visually represented as capsules.

The user is enabled to select, via a mouse click or another selection mechanism, any such recommended search constraint. For instance, the user has already selected the recommended search constraint "cute" 116 from recommended search capsule box 120. Upon selection, the search constraint 116 is transferred from the recommended search capsule box 120 to the search bar (i.e., the set of search capsules 110). Once the set of search capsules 110 is updated to include search constraint 116, the user is enabled to set an associated weight. That is, the user may set the value for weight #2 118. When a search constraint is added, deleted, or modified within the set of search capsules 110 (or an associated weight is modified), the search results are automatically updated based on each of the search constraints included in the set of search capsules 110 and the associated weights. For instance, the recall set may be re-ranked or re-ordered based on the values of the weights associated with each search constraint included in the updated set of search capsules 110. The updated recall set may be provided to the user via search results box 130. The user is now enabled to select additional keyword constraints from the recommended search capsule box 120 or provide additional search constraints to add to the set of search capsules.

The user may select one or more search constraints on which to base the recommended search constraints. For instance, in FIG. 1, the user has selected keyword search constraint "baby" 112 (i.e., the base constraint), as indicated via the shading of the capsule. The recommended search constraint capsules 120, including keyword search constraint "child" 122 are based on the selected search constraint 112. That is, each search constraint included in recommended search capsule box 120 is statistically associated with search constraint 112. The user may alternatively select keyword search constraint "cute" 116. Search constraint 112 would automatically be de-selected (or unshaded), and the recommended search capsule box 120 would be automatically populated with search constraint capsules statistically associated with the newly selected (and shaded) search constraint "cute" 116. In the various embodiments, the user may select multiple search constraints to base the generation of the recommended search constraints. For instance, the user may select each of search constraint 112 and search constraint 116. In such a scenario, a set of recommended search constraint would automatically be determined, such that each recommended search constraint included in the recommended search capsules 120 would have a statistical relationship to each of the keywords "baby" and "cute."

The user may optionally provide a selected image to generate one or more additional search constraints. For instance, the user may select, via a mouse-click or another selection mechanism, an image from the search results box 130, such as but not limited to image 134. As shown in FIG. 1, image 134 from the search results is shown as selected image 144 in the selected image box 140. Alternatively, the user may provide a selected image via the add image button 142 and/or 102. Upon providing the selected image, the selected image may be displayed via selected image box 140.

The user may add various search constraints to the set of search capsules 110 based on the selected image 144. For instance, the user may add an image similarity search constraint, via the add image similarity search capsule button 146, wherein selected image 144 serves as the example image. Although not shown in FIG. 1, a capsule that shows at least a portion of selected image 144 as a thumbnail image may be added to the search box 104 to visually indicate an image similarity search constraint. As discussed throughout, when adding an image similarity search constraint to the set of search capsules 110, the user may provide additional information regarding the image similarity search constraint, such as but not limited to as to the specific targeted features, characteristics, or properties of the example image to perform the similarity analysis. For instance, one or more cascading drop-down menus may appear when the user selects the add image similarity search capsule button 146, providing the user additional control over the image similarity search. When added to the search box 104, the user may set and/or adjust a weight value associated with the image similarity search constraint.

When an image is selected and added to the selected image box 140, values for aspects of the image are determined. For instance, the content depicted in the image and the location (both geo-location and the location within the image) may be determined. The colors depicted in the image may be determined. Various image aesthetic values may be determined. Additional keywords statistically associated with the image may be determined. Metadata associated with the image may be accessed and/or an image classifier, such as but not limited to image classifier 300 of FIG. 3 may be employed to determine the aspects. The determined values for the aspects may be employed as recommend search constraints. For instance, each value for image aesthetics may be viewed and added to the search constraint set via the add image aesthetic search capsule button 148. Cascading drop-down menus may be employed for the user to browse through the various images aesthetic qualities and determined values.

The user may be enabled to add color search constraints to the search constraint set via the add image color search constraint box 150. The add image color search constraint box 150 shows the most dominant colors depicted in the selected image 144, as selectable color capsules 152, 154, 156, and 158. The user need only to select one of these color capsules to add the color search constraint to the set of search capsules box 110. Once added to the search constraint set, the user may be enabled to provide an associated weight and one or more values or ranges for the dominance of the color search constraint.

Additional keyword search constraints that are statistically associated with the content depicted with selected image 140 are determined and provided to the user as recommended keyword search constraints. As shown in the add image keyword search constraint box 160, additional keyword search constraint capsules are shown. Similar to the color search constraint capsules of box 150, a keyword capsule, such as but not limited to keyword search capsule 162, may be selected and added to the set of search constraints.

A user may apply one or more search filters to the search results box 130 via the apply search filters but 170. Such filters include, but are not limited to content type filters, orientation (e.g., portrait v. landscape) filters, category filters, pricing filters, and the like. Although not shown in FIG. 1, UI 100 may include buttons that enable the user to enable/disable (turn "on" and "off") the functionality of individual search constraints.

Also not shown in FIG. 1, UI 100 may include a mechanism enabling the user to save and/or share a search constraint set. For example, search constraint sets may be shared and/or traded amongst connections in a social network or platform. Accordingly, a user may save, share, access, re-use, and/or re-purpose previously saved/shared search constraint sets. After accessing an already existing search constraint set, the user may continue to modify the search constraint set by editing, deleting, or modifying the included search constraints. In addition to adding, deleting, or modifying search constraints, the user may apply various filters to the search results via the apply filter button 170. For instance, the user may logically concatenate filters to be applied to the search results. In various embodiments, the user may toggle (i.e., enable and disable) the operability of the individual search constraints in the search constraint set (as well as the filters) via binary "on/off switches" provided by UI 100. That is, in order to visually inspect the effects of the separate search constraints on the updating and/or ranking of the search results, in addition to adjusting the weight values of the search constraints in an analog-like fashion, the user may turn "off" and "on" (in a digital fashion), individual search constraints of the search constraint set. Such features enable the user to visually inspect, in real time, the resulting updating and/or re-ranking of the search results based on the weighting and the "on/off" state of each of the search constraint and filters. Additional aspects of the various embodiments will now be discussed.

Figure 2:
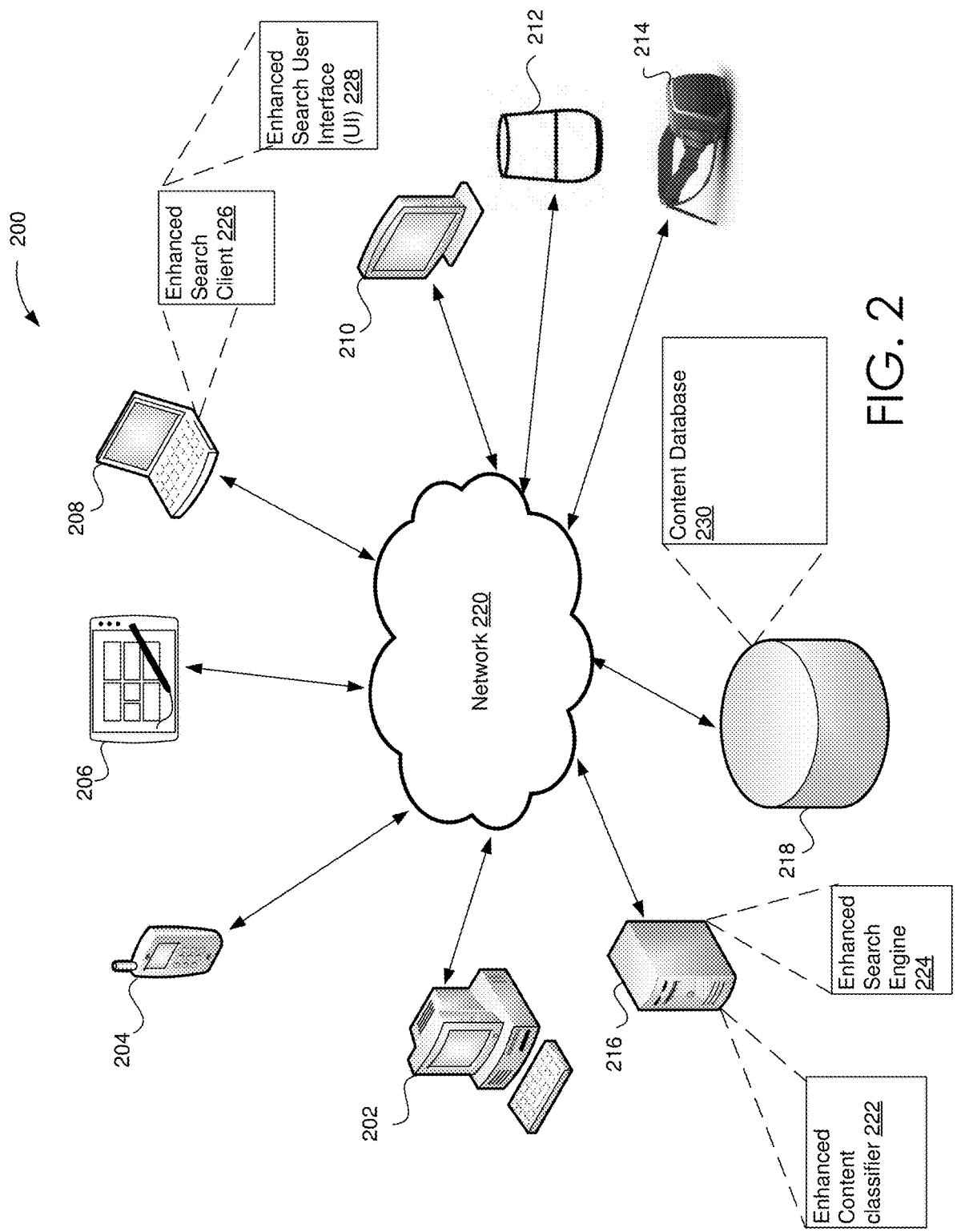
FIG. 2 illustrates an enhanced content search system implementing various embodiments presented herein.

Many embodiments for embedding search constraints and content/images within vector spaces, ranking weighted search results, graphical user interface features, and other technical implementation details that may be employed by the various embodiments herein, are discussed within U.S. patent application Ser. No. 15/824,836, entitled IMAGE SEARCHING BY EMPLOYING LAYERED SEARCH CONSTRAINTS, and filed on Nov. 28, 2017, the entirety of the contents of which are herein incorporated by reference Example Operating Environment FIG. 2 illustrates an enhanced content search system 200 implementing various embodiments presented herein. Search system 200 includes one or more of various user computing devices, such as but not limited to desktop 202, smartphone 204, tablet 206, laptop 208, smart TV 210, virtual assistant (VA) device 212, and virtual reality (VR) and/or augmented reality (AR) headset 214. Other embodiments may include additional and/or alternative user computing devices. In other embodiments, system 200 may include more or less user computing devices. For instance, system 200 may include additional mobile devices, wearable devices, and the like. Any user computing device, such as but not limited to user-computing devices 202-214 may be enabled to provide at least portions of the discussed enhanced search services.

System 200 may also include server computing device 216. An exemplary, but non-limiting embodiment of a user computing device is discussed in conjunction with at least computing device 900 of FIG. 9. That is, at least structures, functionalities, or features of computing device 900 may be included in any of user computing devices 202-214 and/or server computing device 216. System 200 may include one or more storage devices, such as but not limited to storage device 218.

A general or specific communication network, such as but not limited to communication network 220, may communicatively couple at least a portion of user-computing devices 202-214, server computing device 216, and storage device 218. Communication network 220 may be any communication network, including virtually any wired and/or wireless communication technologies, wired and/or wireless communication protocols, and the like. Communication network 220 may be virtually any communication network that communicatively couples a plurality of computing devices and databases in such a way as to computing devices to exchange information via communication network 220.

Storage device 218 may include volatile and non-volatile storage of digital data. Storage device 218 may include non-transitory storage media. Communication network 220 may communicatively couple storage device 218 to at least a portion of user-computing devices 202-214 and/or server computing device 216. In some embodiments, storage device 218 may be a storage device distributed over multiple physical storage devices. Thus, storage device 214 may be a virtualized storage device. For instance, one or more "cloud storage" services and/or service providers may provide, implement, and/or enable storage device 218. Such cloud services may be provided by a third party.

Any computing device of system 200, such as but not limited to any one or more of user computing devices 202-214 or server 216, may execute, host, or otherwise enable the operation of enhanced content classifier 222. A non-limiting exemplary embodiment of an enhanced content characterizer, such as enhanced content classifier 222, is discussed in conjunction with enhanced image classifier 300 of FIG. 3A. Briefly, content classifier 222 may classify and/or quantify various aspects of digital content and generate metadata encoding or otherwise indicating the classified aspects.

Any computing device of system 200, such as but not limited to any one or more of user computing devices 202-214 or server 216, may execute, host, or otherwise enable the operation of enhanced search engine 224. Similarly, any computing device, such as but not limited any one or more of user computing devices 202-214 or server 216, may execute, host, or otherwise enable the operation of enhanced search client 226. In some non-limiting embodiments, search engine 224 provides enhanced search services to search client 226 over communication network 220. A non-limiting exemplary embodiment of an enhanced search engine, such as search engine 224, is discussed in conjunction with enhanced search engine 350 of FIG. 3C.

Enhanced search client 226 provides an enhanced search user interface (UI) 228 so that a user of the computing device hosting search client 226 may control, define, manipulate, edit, or otherwise receive the enhanced services of search engine 224. Various non-limiting embodiments of an enhanced search UI are discussed in conjunction with at least UI 100 of FIG. 1. In some embodiments, engine 224 and client 226 are implemented on the same computing device. In at least one embodiment, a server-client architecture, such as the server-client architecture shown in FIG. 2 is not employed.

Storage device 218 may store one or more content databases, such as content database 230. Content database 230 may store one or more collections of content and/or metadata associated with the content included in one or more content collections. A non-limiting exemplary embodiment of a record of an item of digital content included in content database 230 is discussed in conjunction with enhanced image database record 320 of FIG. 3B. Search engine 224 may search the records of content databases 230, including but not limited to the content and/or content metadata included in content database 230.

Example Image Classifier

Figure 3B:
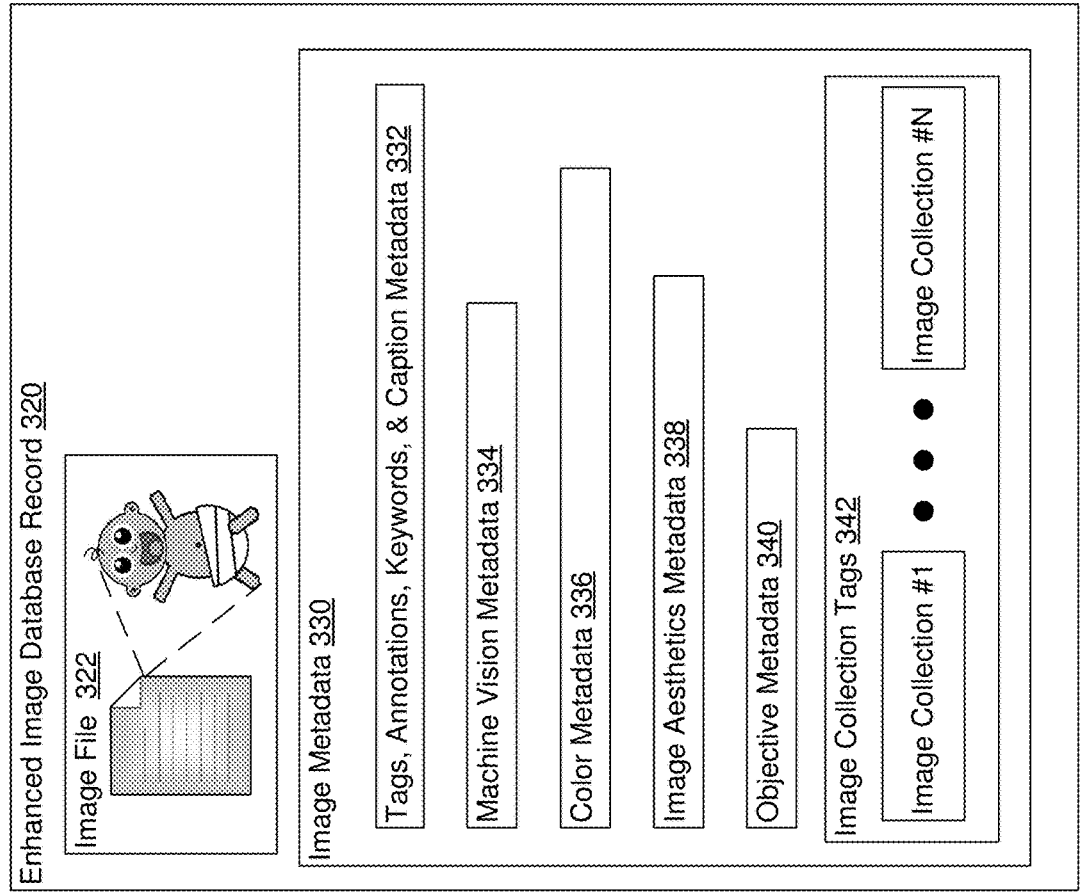
FIG. 3B illustrates one embodiment of an enhanced image database record that is consistent with the various embodiments presented herein.
Figure 3A:
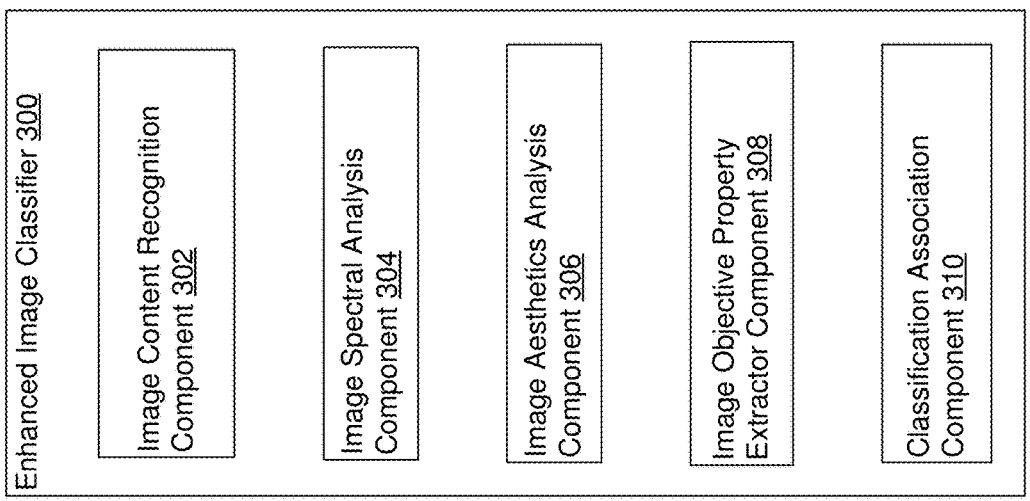
FIG. 3A illustrates one embodiment of an enhanced image classifier that is consistent with the various embodiments presented herein.

FIG. 3A illustrates one embodiment of an enhanced image classifier 300. Image classifier 300 is a non-limiting example of an enhanced content classifier, such as but not limited to enhanced content classifier 222 of FIG. 2. Image classifier 300 may be employed to classify and/or quantify various aspects of digital images. Image classifier 300 may additionally generate structured or unstructured metadata that encodes, or otherwise indicates the classified and/or quantified aspects of the image. The image and/or the associated metadata may be stored as a record, such as but not limited to enhanced image database record 320 of FIG. 3B, within a searchable image database, such as but not limited to content database 230 of FIG. 2. Various aspects of images, such as but not limited to image included in a searchable database and any image employed as an example image in an image similarity search constraint may be classified and/or quantified. The classification and/or quantification of such images enables the various embodiments discussed herein.

Image classifier 300 includes an image content recognition component 302. Content recognition component 302 may employ various machine-vision and/or image analysis methods to automatically recognize, classify, and quantify various content depicted within an image, including but not limited to objects, persons, scenes, and/or locations depicted within the image. Content recognition component 302 additionally generates various metadata encoding, or otherwise indicating the automatically recognized, classified, and/or quantified content. For instance, content recognition component 302 may generate textual metadata, such as but not limited to tags, keywords, annotations, and captions associated with objects, persons, scenes, and locations, depicted in the image.

Content recognition component 302 may generate various machine-vision metadata associated with the image. Such machine-vision metadata may include various hidden or latent features of an image determined via neural networks, or other image analysis techniques. Machine-vision metadata may include one or more data structures, such as a vector embedded within a searchable space. The vectors may represent hidden and/or latent features determined and/or recognized in a machine-vision analysis. As noted throughout, a search constraint may also be represented by a vector. Such image and search constraint vectors are employable to determine a "distance" between the search constraint and the image. The distance may be employed to determine a relevancy score. Similarly, for any two images for an image similarity, or search by example, search constraints, such vector representations may be employed to determine a distance between the example image and the searched image. Machine-vision metadata may include the positions, within the image, of the recognized content depicted within the image. Such positions may be indicated via pixel maps. Such content-position metadata may indicate whether various content is located in the foreground or background of the image, which pixels the content is located within, the quadrant the content is located in (e.g., the upper-left quadrant or the lower-right quadrant), and the like.

Image classifier 300 includes an image spectral analysis component 304. Spectral analysis component 304 may analyze the pixel distribution for various colors or grayscale values depicted within the pixels of an image. Spectral analysis component 304 may generate various metadata, such as color metadata, encoding or otherwise indicating the distribution of colors and/or greyscale depicted within the image. For example, spectral analysis component 304 may generate color metadata indicating that 25% of the pixels of an image depict color_A, 65% of the pixels depict color_B, and 10% of the pixels depict color_C.

Image classifier 300 includes an image aesthetics analysis component 306 that analyzes the aesthetics of an image. Such aesthetics may include, but are not otherwise limited to hue, saturation, lightness, intensity, quantity, and the like. Other image aesthetics analyzed by image aesthetics analysis component 306 may include, but are not otherwise limited to color harmony, depth of field, interesting content, interesting lighting, motion blur, out-of-focus blur (e.g., image bokeh), object emphasis, quality, repetition, and the like. Image aesthetics analysis component 306 may generate various metadata, such as image aesthetics metadata, encoding or otherwise indicating values for the various analyzed aesthetics of the image.

Image classifier 300 may include an image objective property extractor component 308. Image objective property extractor component 308 may extract and/or generate objective metadata indicating various objective features, characteristics, and properties of the image. Such objective metadata may include various metadata such as date and/or timestamps associated with the image, the geolocation of a camera device that captured the image, the local weather and/or climate when the image was captured, or an identifier of the photographer, author, or artist that created image. Such other objective metadata may include an identifier (e.g., a MAC address, an IP address, or the like) of the camera device, settings/configurations/modes of the camera device (e.g., fast-burst mode, filter settings, flash configurations, or the like), configurations of lenses or other optical components used to generate the image, and the like.

The examples discussed herein of metadata generated by the various components of image classifier 300 are non-exhaustive. Image classifier 300 may classify and/or quantify virtually any aspect of an image, as well as generate other various forms of metadata that at least partially indicates any property, feature, classification, content, characterization, or aspect of an image. Any such metadata may be structure or unstructured metadata, associated with the image, and stored as a record in a searchable database.

Various embodiments of image classifier 300 may include a classification association component 310. A classification association component may employ various forms of statistical analyses to determine statistical association between the various recognized and/or classified aspects of the analyzed image. Based on such statistical analyses, classification association component 310 may generate additional metadata that is statistically associated with the metadata generated by the other included components. For instance, when content recognition component 302 recognizes an infant depicted within an image and generates the keyword tag metadata "infant," classification association component 310 may generate additional metadata, such as keyword metadata "baby," "child," "cute," and the like. Such statistically associated metadata may be associated with the image and stored in the database record, along with the other metadata associated with the image. Image classifier 300 may be enabled to embed an image within a vector space based on the various classifications of the aspect of the image. That is, image classifier 300 may generate a vector representation for a classified image.

Example Content Database Record

FIG. 3B illustrates one exemplary embodiment of an enhanced image database record 320 stored in a searchable database. As such, content database 230 of FIG. 2 may store a plurality of similar records. Image database record 320 is a non-limiting embodiment of a content database record that is searchable by the enhanced search system 200 of FIG. 2, or any of the various embodiments described herein. In addition to image database record 320, system 200 may search digital audio database records, digital video database records, digital multimedia database records, textual document database records, and the like.

Image database record 320, may include an item of digital content, such as but not limited to image file 322 that encodes an image. Various forms of image metadata 330 may be associated with image file 322 and stored and/or included in image database record 320. For instance, any metadata generated via an image classifier, such as but not limited to image classifier 300 of FIG. 3A, may be included in image database record 320. Image metadata 330 may include any data that is associated with an image included in an image database, such as but not limited to content data 230 of FIG. 2. Such metadata may at least partially encode a classification and/or a quantification of any aspect of the associated image.

Figure 3C:
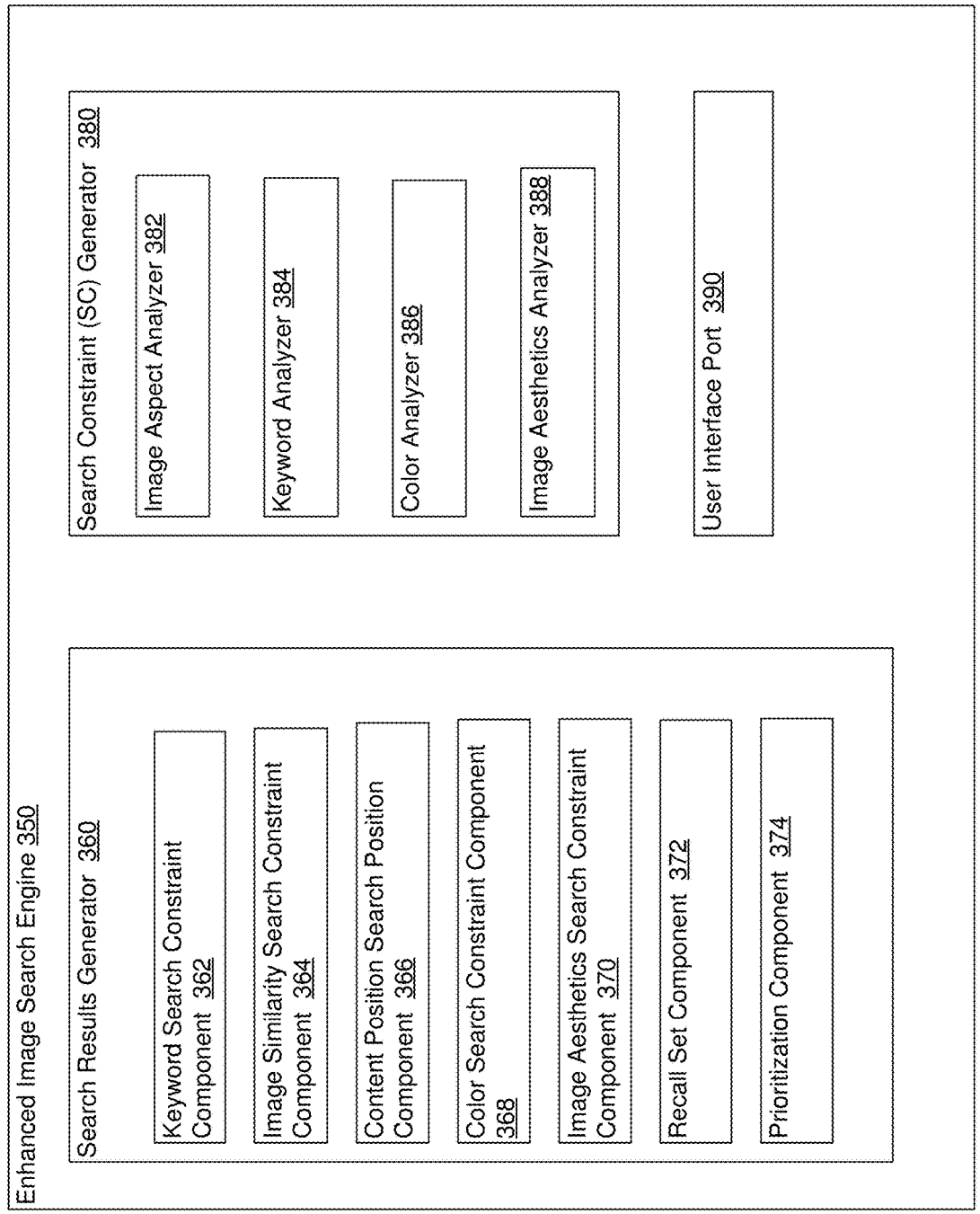
FIG. 3C illustrates one embodiment of an enhanced search engine that is consistent with the various embodiments presented herein.

The metadata may be employed in a search, via enhanced search engine 224 of FIG. 2 and/or enhanced search engine 350 of FIG. 3C. That is, image metadata may include any data that indicates and/or encodes any aspect of the associated image. As discussed throughout, the various types of search constraints discussed herein target various forms of the (structured or unstructured) image characterizing metadata included in image metadata. For example, search engine 224 may determine a relevancy of an image in a database to one or more search constraints included in a search constraint set provided to search engine 224 based on the metadata associated with the image.

As discussed throughout, a user may manually provide and/or generate at least portions of image metadata 330. As a non-limiting example, a user that submits the associated image to the content database 230 may also provide portions of the associated image metadata 330. Automated techniques, such as but not limited to various forms of image analysis or machine-assisted image characterization (e.g., machine-vision methods), may be employed by an image classifier, such as image classifier 300, to generate other portions of image metadata 330. For example, machine vision based on one or more convolutional and/or deconvolutional neural networks may be employed to generate portions of image metadata 330. That is, machine learning, including deep learning via neural networks with many layers, may be employed to generate metadata that classifies and/or quantifies various aspects of an image.

Image metadata 330 may include various forms of textual metadata, including tags, annotations, keywords, and image caption metadata 332. Such textual metadata may indicate, represent, or otherwise encode various aspects, such as but not limited to depicted content, of the associated image. For instance, textual metadata may include keyword tags of objects, persons, scenes, locations, or the like depicted within the associated image. Image analysis, machine vision, or deep learned neural networks may be employed to automatically generate portions of textual metadata. As an example, a deep-learned neural network may be trained to recognize such content depicted with an image. Various forms of textual metadata may automatically be generated based on such machine-vision techniques. As noted above, at least portions of the textual metadata may be manually provided via a user. For instance, users may manually provide textual metadata for images included in image database record 320, such as keyword tags, annotations, captions (e.g., natural language descriptions of the image), and the like associated with an image.

In addition to the textual metadata generated via machine vision, other machine vision metadata 334 may be included in image metadata 330. For instance, machine vision metadata 334 may include various hidden or latent features of an image determined via neural networks, or other image analysis techniques. Machine-vision metadata 334 may include one or more data structures, such as a vector embedded within a searchable space. The vectors may represent hidden and/or latent features determined and/or recognized in a machine-vision analysis. Such vectors are employable to determine a "distance" between an image and a search constraint. For instant, for a search by example search constraint, the vectors may be employed to determine a distance between any two images.

Image metadata 330 may include color metadata 336. Color metadata 336 may include the pixel distribution for various colors or grayscale values depicted within the pixels of an image. As a non-limiting example, color metadata 336 associated with an image may indicate that 25% of the pixels of an associated image depict color_A, 65% of the pixels depict color_B, and 10% of the pixels depict color_C. At least portions of color metadata 336 may be generated automatically via image analysis.

Image metadata 330 may include various forms of image aesthetics metadata 338. Image aesthetics metadata 338 may include any data characterizing and/or indicating various aesthetic properties of an image, such as but not limited to hue, saturation, lightness, intensity, quantity, color harmony, depth of field, interesting content, interesting lighting, motion blur, out-of-focus blur (e.g., image bokeh), object emphasis, quality, repetition, and the like. At least portions of the image aesthetics metadata 338 may be generated automatically via an image classifier.

Image metadata 330 may include additional metadata, such as but not limited to objective metadata 340. Objective metadata 340 may include various metadata such as date and/or timestamps associated with the image, the geolocation of a camera device that captured the image, or an identifier of the photographer, author, or artist that created image. Such other objective metadata 340 may include an identifier (e.g., a MAC address, an IP address, or the like) of the camera device, settings/configurations/modes of the camera device (e.g., fast-burst mode, filter settings, flash configurations, or the like), configurations of lenses or other optical components used to generate the image, and the like.

Image metadata 330 may include image collection tags 342 that indicate collections of images, such as image collection #1, image collection #2, image collection #3, and image collection #N, where N is any positive integer in which the image is included. The image collections may be private collections, public collections, shared collections, or the like. A user may individually select, via a search UI, such as search UI 100 of FIG. 1, one or more such collections to search. The selectable collections may be limited based on the user's credentials and privacy configurations for the collections. Such image collections may include folders of digital images, sets of digital images, sequences of digital images, or the like.

The examples discussed herein of metadata included in image metadata 330 are non-exhaustive, and image metadata may include other various forms of metadata that at least partially indicates any aspect of the associated image. More generally, any database searched via the enhanced searched systems and methods discussed herein may include any (structured or unstructured) metadata that encodes and/or represents any feature, property, function, aspect, or characteristic of the associated content.

Example Search Engine

FIG. 3C illustrates an enhanced search engine 350 that is consistent with the various embodiments presented herein. Search engine 350 is an non-limiting example of an enhanced search engine, such as but not limited to enhanced search engine 224 of FIG. 2. Search engine 350 may include a user interface (UI) port 390 that is communicatively coupled to a search UI, such as but not limited to UI 100 of FIG. 1 or UI 228 of FIG. 2.

At a high level, search engine 350 may include a search results generator 360, and search constraint generator 360, and a user interface port 390. The search results generator 360 may receive a search constraint set via UI port 390. As discussed throughout, the search constraint set may include a weight for each of the included search constraint set. Search results generator 360 may generate and/or update the search results based on the received search constraint set and the weights, as described herein. Search results generator 360 may provide the generated and/or updated search results to the search UI via UI port 390. Search engine 350 may include search constraint generator 380. The search constraint generator 380 may receive one or more user selected search constraints or a user selected example image via UI port 390. Search constraint generator 380 may generate and/or determine one or more recommended search constraints, as described in conjunction with the various embodiments herein. Search constraint generator 38 may provide the one or more recommended search constraints to a UI via UI port 390.

Returning to the search results generator 360, the search results generator 360 may include one or more of a keyword search constraint component 362, an image similarity search constraint component 364, or a content position search constraint component 366. Search results generator 360 may further include one or more of a color search constraint component 368 or an image aesthetics search constraint component 370. Search results generator 360 may additionally include one or more of a recall set component 368 or a prioritization component 370.

Keyword search constraint component 362 may perform an image search based on one or more keyword search constraints included in a search constraint set. Image similarity search constraint component 364 may perform an image search based on one or more example images included in a search constraint set, e.g., an image similarity search constraint. Image similarity search constraint component 364 may determine and/or generate a relevancy score for images in the searched database based on content depicted in one or more example images included in one or more image similarity search constraints and associations and/or relationships with the content depicted in the image included in the database.

Content position search constraint component 366 may perform an image search based on one or search constraints directed towards the position of content within an image. That is, search constraint component 366 performs searches, where the search constraint includes limitations on the position of content within an image. For instance, search constraints that limit where the content can or cannot be located within the image. Content position search constraint component 366 may determine and/or generate a relevancy score for images in the searched database based on a search constraint that indicates where the user wants content to be positioned, or alternatively not positioned, in an image and the positions of content in the image included in the database.

Color search constraint component 368 may perform an image search based on one or more color search constraints included in a search constraint set. Color search constraint component 368 may determine and/or generate a relevancy score for images in the searched database based on a search constraint that indicates a color the user wants depicted in an image and the colors depicted in the image included in the database. Note that color search constraints may additionally include a value or range of values indicating a desired dominance. A dominance may include a minimum and/or a maximum for an absolute or relative number of the image pixels to be of or similar to the color defined via the search constraint value. Thus, the relevancy scores determined by the color search constraint component 368 may be further based on the dominance values included in the color search constraint.

Image aesthetics search constraint component 370 may perform an image search based on one or more image aesthetics search constraints included in a search constraint set. Such image aesthetics search constraints may include one or more search values for the hue, saturation, lightness, intensity, quantity, color harmony, depth of field, interesting content, interesting lighting, motion blur, out-of-focus blur (e.g., image bokeh), object emphasis, quality, or repetition for images of interest. Image aesthetics search constraint component 370 may determine and/or generate a relevancy score for images in the searched database based on a search constraint that indicates an image aesthetic quality and a corresponding value that the users wants depicted in an image and the values of the aesthetic image quantities depicted in the image included in the database.

Recall set component 372 generates a recall set based on one or more base search constraints included in the search constraint set. For instance, recall set component 372 may employ any search component, such as but not limited to any of components 362-370 to generate a recall set for the search results. The recall set may be based on the relevancy scores determined for the base search constraint. Prioritization component 374 may update the recall set as additional search constraints are added or deleted from the search constraint set. Prioritization component 374 may prioritize the search results based on the weights associated with the individual search constraints include in the search constraint set. For instance, prioritization component 374 may re-order or re-rank items included in the search results based on each search constraint included in the search constraint set and the associated weights. Prioritization component 372 may employ any search component, such as but not limited to any of components 362-370 to update and/or prioritize the recall set for the search results. Prioritization component 372 may prioritize, rank, or order the search results based on the weights and relevancy scores for each search constraints, as discussed throughout.

Turning now to the search constraint generator 380, the search constraint generator 380 may include one or more of an image content analyzer 382, a keyword analyzer 284, a color analyzer 286, and/or an image aesthetics analyzer 388. As noted above, search constraint generator 380 may receive one or more selected search constraints from the search constraint set and/or one or more selected example images. Search constraint generator 380 may generate one or more recommended keyword search constraints, one or more recommended color search constraints, and/or one or more image aesthetics search constraints based on one or more other search constraints and/or an example image.

Search constraint generator 380 may include an image aspect analyzer 382. Image aspect analyzer 382 may analyze the aspects of an example image or otherwise values encoding the various aspects. In some embodiments, image aspect analyzer 382 may include one or more similar functionality and/or components to an image classifier, such as but not limited to content classifier 222 of FIG. 2 and/or image classifier 300 of FIG. 3A. Image aspect analyzer may employ machine vision and other image analysis methods to classify and/or quantify various aspects of an image. That is, image aspect analyzer 382 may generate any of the metadata discussed in conjunction with image classifier 300 based on the example image. In other embodiments, image aspect analyzer 382 may access any metadata associated with the example image via a database record, such as but not limited to image database record 320 of FIG. 3B. As such, image aspect analyzer 382 may access any metadata associated with the example image, such as but not limited to the metadata discussed in conjunction with image database record 350. The image aspect analyzer 283 may provide other analyzers, such as but not limited to keyword analyzer 384, color analyzer 386, or image aesthetics analyzer 388 with metadata encoding the various aspects of an image, such that these other analyzer may generate and/or determine recommend search constraints, such as but not limited to keyword search constraints, color search constraints, or image similarity search constraints.

Keyword analyzer 384 may determine one or more keywords statistically associated with and/or related to one or more search constraint and/or an example image. That is, keyword analyzer 384 may determine and/or generate one or more keyword constraints to recommend based one or more search constraints included in a search constraint set or an example image. For instance, keyword analyzer 384 may generate a keyword search constraint based on the metadata (provided via image aspect analyzer 382) that encodes various aspects of a user-selected image. Keyword analyzer 384 may employ any information generated, determined, or accessed by image aspect analyzer 382 in determining the statistically associated recommended keyword search constraints. Any machine learning methods, such as but not limited to clustering analysis, may be employed to determine the statistically associated keywords. Word embedding models, such as but not limited to Word2Vec, may be employed to determine keywords statistically associated with provided search constraints or content depicted within an example image. As an example, a word-embedding model may generate a statistical association between keywords, such as "baby," "cute," "newborn," "crying," "happy," "smiling," and the like. In some embodiments, at least a database, such as but not limited to a database including synonyms and antonyms (e.g., a thesaurus database), may be consulted to generate the statistical associations. The statistical associations may include a semantic similarity and/or difference, as well as a contextual similarity and/or difference. Other word-embedding models and/or other forms of cluster analysis may be employed to generate such associations.

Color analyzer 386 may determine one or more colors statistically associated with and/or related to one or more search constraint and/or an example image. That is, color analyzer 386 may determine and/or generate one or more color constraints to recommend based one or more search constraints included in a search constraint set or similar colors depicted within an example image.

Image aesthetics analyzer 388 may determine one or more values for image aesthetic qualities statistically associated with and/or related to one or more search constraint and/or an example image. That is, aesthetics analyzer 388 may determine and/or generate one or more values for image aesthetic search constraints to recommend based one or more search constraints included in a search constraint set or similar aesthetic qualities and values of an example image.

Generalized Processes for Searching Digital Content

Although processes 400-800 of FIGS. 4-8 are discussed in the context of searching digital image content, it should be understood that the various embodiments are not so limited. That is, one of ordinary skill in the art would understand how the following discussion of processes 400-800 may be readily adapted for searching other forms of digital content, such as but not limited to digital audio content, digital video content, digital multimedia content, textual documents, and the like. Processes 400-800, or portions thereof, may be performed and/or executed by any computing device, such as but not limited to user computing devices 202-214 and server computing device 216 of FIG. 2, as well as computing device 900 of FIG. 9. Additionally, search engine, such as but not limited to search engine 224 of FIG. 2 or search engine 350 of FIG. 3C, may perform and/or execute at least portions of processes 400-800. A search client, such as but not limited to search client 226 of FIG. 2, may perform and/or execute at least portions of processes 400-800. For instance, a search client may provide a user of a computing device a search user interface (UI) such as but not limited to UI 100 of FIG. 1 or UI 228 of FIG. 2. A content classifier, such as but not limited to content classifier 222 of FIG. 2 or image classifier 300 of FIG. 3A, may perform and/or execute at least portions of processes 400-800.

Figure 4:
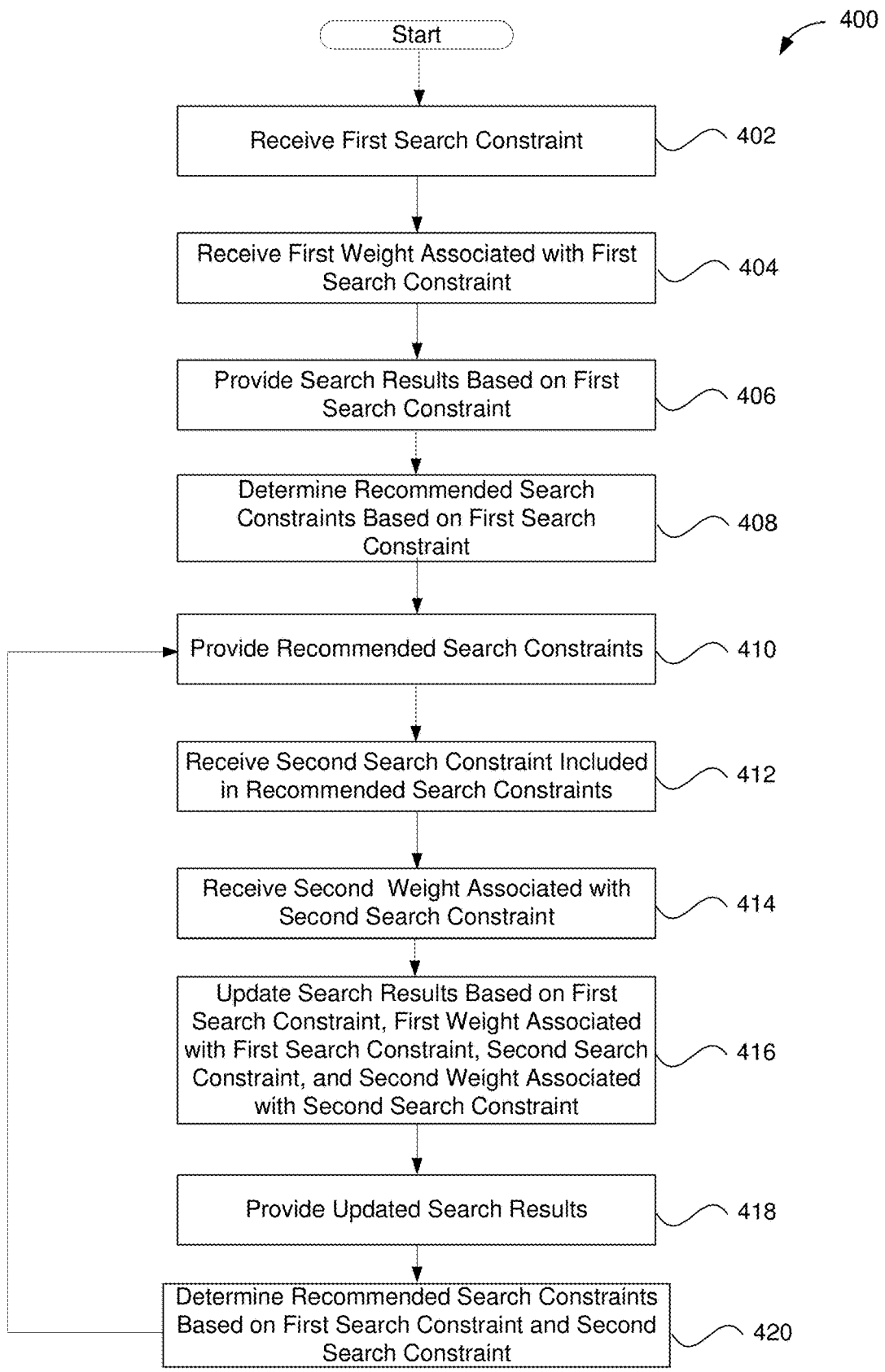
FIG. 4 illustrates one embodiment of an enhanced process flow for searching digital content that is consistent with the various embodiments presented herein.

FIG. 4 illustrates one embodiment of an enhanced process flow for searching digital content that is consistent with the various embodiments presented herein. Process 400 begins, after a start block, at block 402, where a first search constraint is received. The type of constraint may be virtually any search constraint discussed herein. For instance, the first search constraint may be a keyword, a search phrase, a color, one or more values indicating an image aesthetic, or the like. In various embodiments, the first search constraint may include an example image for an image similarity search. The first search constraint may be received at a search engine. In one embodiment, a user may provide the first search constraint via a search UI and/or a search client. The first search constraint may be a base search constraint.

At block 404, in some embodiments, a first weight associated with the first search constraint is received by the search engine. In other embodiments, the first weight is set to a default value, such as but not limited to a maximum weight. The weight may be a numerical value as discussed herein. At block 406, search results based on the first search constraint are generated and provided to the user. A search results generator, such as but not limited to search results generator 360 of search engine 350 of FIG. 3C may generate the search results. If the first search constraint includes a keyword, a plurality of images may be provided that depict content related to the keyword. If the search constraint is an image similarity search constraint and includes an example image, a plurality of images similar to the example image may be provided. The search results generated at block 406 may be a recall set of digital images found in an image database, such as but not limited to content database 230 of FIG. 2. The search results may be provided from the search engine to the search UI.

More specifically, at block 406, the search results may include a recall set of content (i.e., a set of content items or set of images). The recall set may be referenced as the content set. The recall or content set may be generated and/or determined by a recall set component, such as but not limited to recall set component 372 of search engine 350. The ranking of the content set may be based on an initial search. As a non-limiting example, the content set may contain M items of content, where M is any positive integer. A relevancy score may be associated with each content item. The relevancy score for each item may be determined via the first (or base) search constraint. This initial ranking of the items may be based on the relevancy score for the content items, e.g., the content item with the highest relevancy score may by ranked as the highest ranked item. The content item with the lowest relevancy score may be ranked as the lowest ranked item. The intermediate content items correspondingly ranked between the highest and lowest ranked items based on corresponding relevancy scores. The rankings for the jth content item may be represented as $r_{0,j}$, where j is a positive integer such that j=1, 2, . . . , M and the 0 subscript indicates that relevancy score is for the initially accessed ranking of the content.

The relevancy score may be any metric generated by a search engine (or other means) that indicates a measure of relevancy or priority to a search constraint or condition of the content item. In some embodiments, the relevancy score is simply the ranked position of the item content. In at least one embodiment, only an unordered list of the content items included in the content set is generated at 406. That is, the initial content set is not ranked based on a relevancy to a first search constraint At block 408, a set of recommended search constraints are determined and/or generated based on the first search constraint. The recommended search constraints are statistically associated with and/or related to the first search constraint. The set of recommended search constraints may be generated and/or determined by a search generator, such as but not limited the search constraint generator 380 of search engine 350. For instance, if the first search constraint is a keyword, the recommended search constraints may include other keywords statistically associated with the first search constraint. If the first search constraint is an example image that depicts a tangible object, the recommended search constraints may include one or more keywords statistically associated with the tangible object, colors depicted within the image, and/or values for aesthetic qualities of the image. At block 410, the recommended search constraints are provided to the user. For instance, user interface port 390 of search engine 350 may provide the recommend search constraints to UI 100 of FIG. 1.

At block 412, a second search constraint is received. The second search constraint may be included in the recommended search constraints. The user may have selected one of the recommended search constraints. In at least one embodiment, the second search constraint is provided directly by the user. For example, the user may type another keyword into a search box. The second search constraint may be a recommended keyword, an image included in the search results, or an aspect, such as a color or image aesthetic value, of an image. At block 414, a second weight is received. The second weight is associated with or corresponds to the second search constraint.

At block 416, the search results are updated based on the second search constraint and the second weight associated with the second search constraint. In some embodiments, the search results are updated based further on the first search constraint and the first weight associated with the first search constraint. For instance, the recall set may be re-ordered and/or re-ranked at block 416. A prioritization component, such as but not limited to prioritization component 374 of search engine 350 may be employed to re-order and/or re-rank the recall set.

More specifically, the first and the second search constraints, as well as the first and second weights may be included in a search constraint set, as discussed throughout. As a non-limiting example, N search constraints and associated weights are included in the search constraint set, where N is a positive integer. Each of the associated weight values may be represented as $w_i$, where i is a positive integer such that i=1, 2 . . . , N. As discussed throughout, the weight values may be appropriately scaled to virtually any pre-defined range. In a non-limiting embodiment, $-100 \le w_i \le +100$. In various embodiments, the first or base weight ($w_0$) may be set to a default value, such as but not limited to the maximum weight value. Thus, in some embodiments, $w_0=+100$. In some embodiments, the value of $w_0$ is fixed or held constant at the default value. In other embodiments, the value of $w_0$ may be received at block 404 and/or adjusted or modified by the user via UI 100 of FIG. 1.

The ranking of the recall set is updated at block 416 based on the images included in the recall set, the search constraints included in the search constraint set, and the associated weights. In some embodiments a search results generator, such as but not limited to search results generator 360 of enhanced search engine 350 of FIG. 3C may be employed to determine a relevancy score for each of the images (or content items) for each of the search constraints included in the search constraint set. The relevancy score for each search constraint for a particular content item may be based on a relevancy of the particular content item to the search constraint. Thus, the relevancy score may be based on a relevancy of metadata associated with the particular item to the search constraint. For instance, a metadata record for an image, such as but not limited to image metadata 330 of FIG. 3B, may be employed to generate the relevancy scores at block 416.

The relevancy scores determined at block 416 may be indicated as $r_{i,j}$, where the subscript i indicates the ith included search constraint (i=1, 2, ..., N) and the subscript j indicates the jth content item (j=1, 2, ..., M) in the recall set. In various embodiments, an updated relevancy score ($\hat{r}_j$) is determined for each content item at block 416. The updated ranking of the content set may be based on the updated relevancy score for each content item, i.e., $\hat{r}_j$. In some embodiments, the updated relevancy score for the jth content item may be determined as $$\hat{r}_j = \frac{\sum_{i=0}^{N} w_i r_{i,j}}{\sum_{i=0}^{N} |w_i|}$$

The relevancy (and thus initial ranking) of the content set to a first search constraint is accounted for by extending the summation of the subscript i to include the i=0 terms. In other embodiments, the summation is only carried out over i=1 to N, or equivalently, the value of $w_0$ is set to 0.0. Thus, in some embodiments, the initial ranking of the content set does not affect the updated ranking at block 416. It should be understood that other weighted ranking metrics may be employed to determine the updated rankings.

At block 418, the updated search results are provided to the user. In some embodiments, at least a portion of the updated ranking of the content set is provided to the user. For instance, search results window 130 of UI 100 may be employed to provide the updated ranking of the content set. In some embodiments, only a predefined number of the highest re-ranked content items are provided to the user, such as but not limited to the highest ranked 10, 20, 50, or 100 content items.

At block 420, additional recommended search constraints are determined. In some embodiments, the additional recommended search constraints based on each of the first search constraint and the second search constraint. In other embodiments, the additional recommended search constraints are based on only one of the first or the second search constraint. In at least one embodiment, the user is enabled to select one or more of multiple search constraints included in a search constraint set to base the determination of additional recommended content. For instance, if a search constraint set includes five separate search constraints, the user may be enabled to select any combination of the search constraints to base the determination of additional search constraints. Process 400 returns to block 410 to provide the additional recommend search constraints to the user. Process 400 may continue to receive additional search constraints and associated weights to add to the search constraint set and further update the search results.

Figure 5:
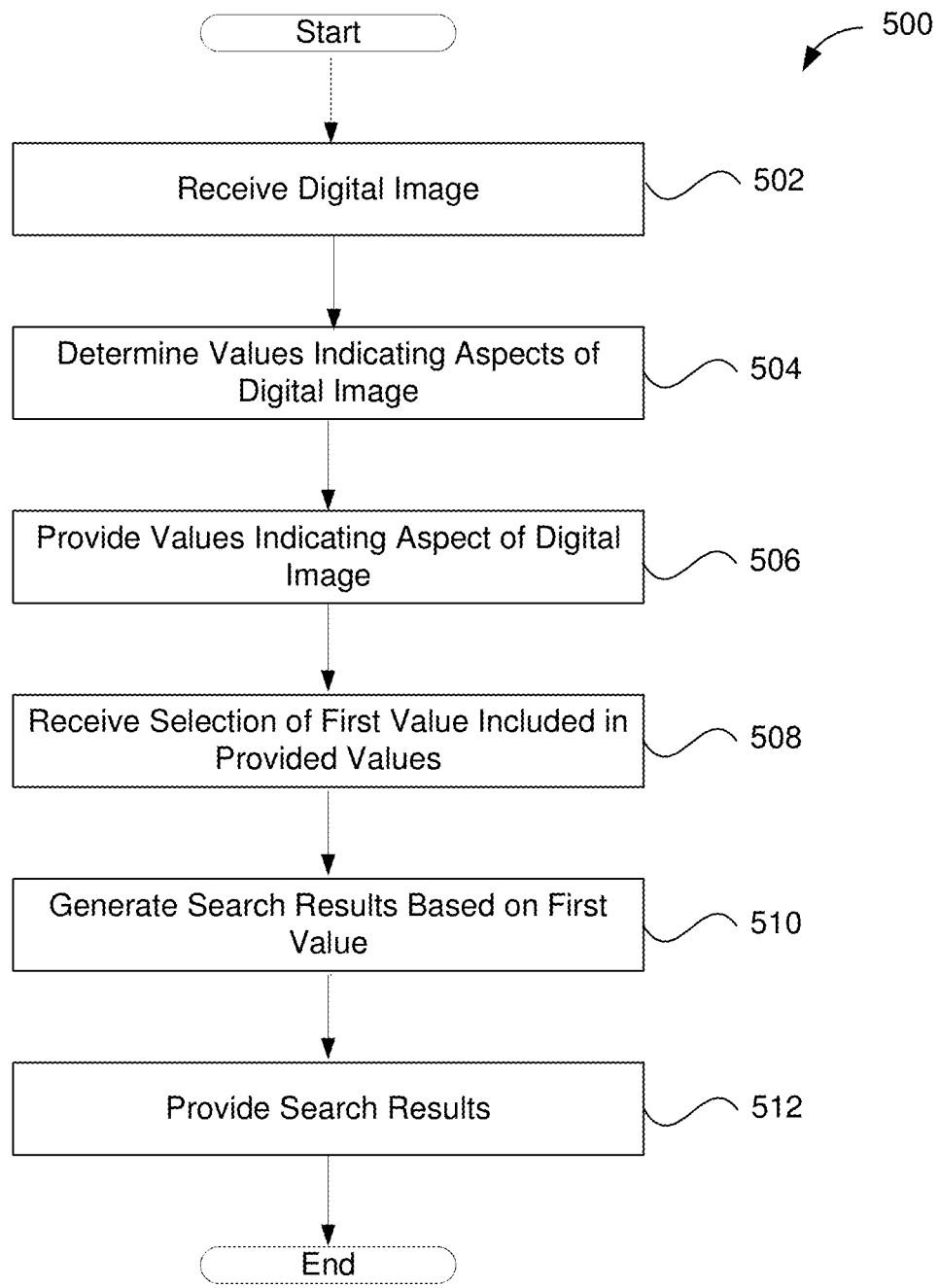
FIG. 5 illustrates one embodiment of an enhanced process flow for searching images that is consistent with the various embodiments presented herein.

FIG. 5 illustrates one embodiment of an enhanced process flow for searching images that is consistent with the various embodiments presented herein. Process 500 begins, after a start block, at block 502 where a digital image is received. The received digital image may be an example image for an image similarity search. The received image may be included in search results previously provided to the user or the user may have provided the image via a UI. For instance, the user may employ add image button 102 of UI 100 of FIG. 1 to provide the image. The image may be received at a search engine, such as but not limited to search engine 350 of FIG. 3C.

At block 504, values that indicate aspects of the image are determined. In some embodiments, an image classifier, such as but not limited to content classifier 222 of FIG. 2 or image classifier 300 of FIG. 3A is employed to determine the values that indicate aspects of the image. Thus, the values and image aspects may include values and aspects indicated in any of the metadata discussed in conjunction with image classifier 300. For instance, the aspects may include content depicted in the image, colors depicted in the image, or image aesthetics. The values indicating the aspects may be textual (e.g., keywords), numerical, or a combination thereof. In other embodiments, the values indicating the aspects may be determined based on one or more database records for the image, such as but not limited to database record 320 of FIG. 3B. Determining the values may include accessing any of the metadata discussed in conjunction with image database record 320. In some embodiments, a search constraint generator, such as but not limited to search constraint generator 380 of search engine 350 may determine and/or generate at least a portion of the values that indicate aspects of the image.

At block 506, at least a portion of the values may be provided to the user. The values may be provided to the user as recommended search constraints via a search UI. For instance, the various image aesthetic values and values representing colors depicted within the image may be provided. In some embodiments, the provided values may include keywords statistically associated with content depicted in the received image. At block 508, a first value included in the provided values is received. For instance, the user may have selected a keyword associated with content depicted within the received image, the value corresponding to a color depicted within the received image, or the value for an image aesthetic quantity of the received image.

At block 510, search results are generated based on the first value. A search results generator, such as but not limited to search results generator 360 of search engine 350 may generate the search results. At block 512, the search results are provided to the user. For example, the search results may be provided to the user based via the search UI. Process 500 may terminate, or the process may receive additional images and/or search constraints (and associated weights) to that are employed to update the search results as discussed herein.

Figure 6:
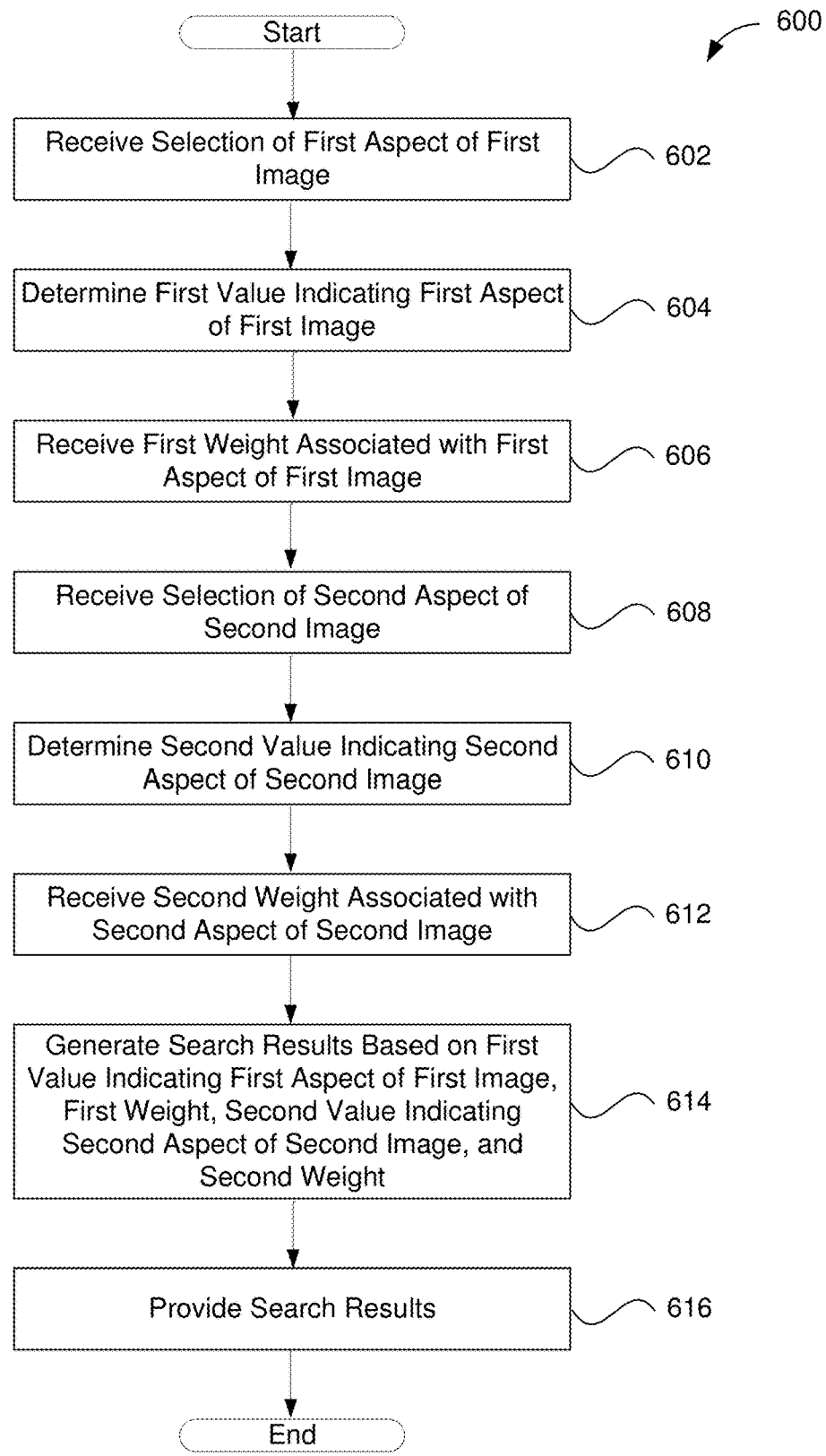
FIG. 6 illustrates one embodiment of an enhanced process flow for image similarity searching with more than one example image that is consistent with the various embodiments presented herein.

FIG. 6 illustrates one embodiment of an enhanced process flow for image similarity searching with more than one example image that is consistent with the various embodiments presented herein. Process 600 begins, after a start block, at block 602, where a selection of a first aspect of a first image is received. For instance, via a search UI, the user may select to search based on the content depicted within the first image, the location and/or position of the content within the first image, one or more colors depicted within the first image, one or more image aesthetic qualities of the first image, or the like.

At block 604, a first value indicating the first aspect of the first image is determined. Search constraint generator 380 of search engine 350 of FIG. 3C may access metadata that encodes the first value. For instance, when the user selects hue as the first aspect, metadata associated with the first image and encoding the hue value for the first image may be generated and/or accessed at block 604. At block 606, a first weight associated with the first aspect is received.

At block 608, a selection of a second aspect of a second image is received. For instance, the user may select the location of the content within the second image. For instance, the user may select the location of the content within the second image. At block 610, a second value indicating the selected second aspect of the second image is determined. At block 612, a second weight associated with the second aspect is received.

At block 614, search results are generated based on the first value indicating the first second of the first image, the first weight, the second value indicating the second aspect of the second image, and the second weight. For instance, search results generator 360 of search engine 350 may generate the search results. At block 616, the search results are provided to the user. Process 600 may terminate after block 616, or continue to research additional search constraints.

Figure 7:
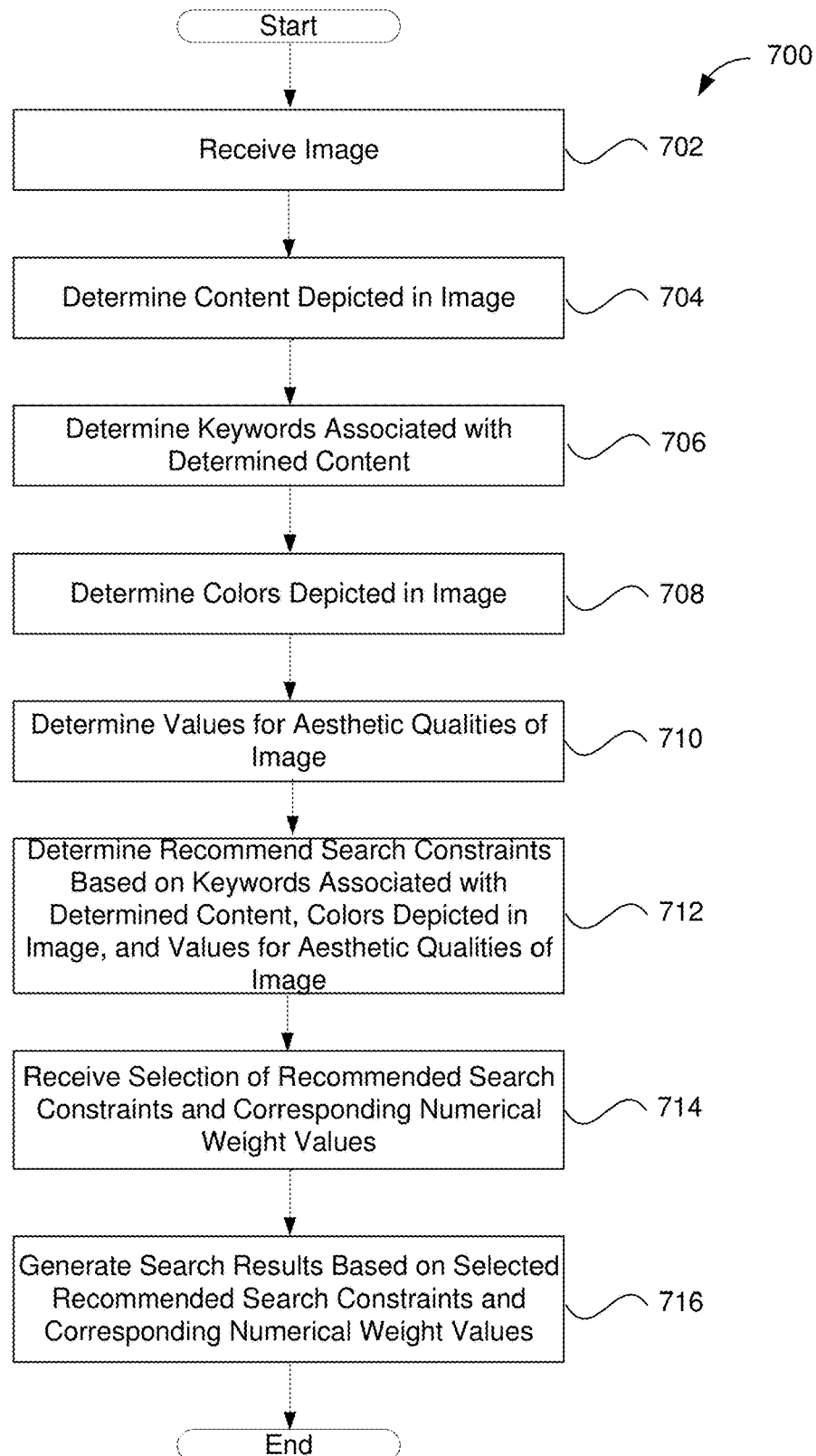
FIG. 7 illustrates one embodiment of an enhanced process flow for searching images that is consistent with the various embodiments presented herein.

FIG. 7 illustrates one embodiment of an enhanced process flow for searching images that is consistent with the various embodiments presented herein. Process 700 begins, after a start block, at block 702, where an image is received. At block 704, the content depicted within the image is determined. Machine-vision methods may be employed to determine the depicted content. For instance, image classifier 300 of FIG. 3A may be employed to determine the content. In other embodiments, metadata previously associated with the image may be accessed to determine the content.

At block 706, a plurality of keywords that are statistically associated with the content may be determined. For instance, word embedding models, such as but not limited to Word2Vec, may be employed to determine keywords statistically associated the depicted content. At block 708, the colors depicted in the image are determined. The colors may be determined via a spectral analysis, or other machine-vision methods. In some embodiments, metadata may be accessed to determine the depicted colors. At block 710, values for aesthetic qualities of the image are determined. Machine-vision and/or metadata may be employed to determine the values for the aesthetic qualities. At block 714, one or more recommended search constraints are determined and/or generated. The recommended search constraints may be based on any combination of the content determined at block 704, the keywords determined at block 706, the colors determined at block 708, and/or the values for aesthetic qualities of the image determined at block 710. The recommended search constraints may be provided to the user.

At block 714, a selection of one or more of the provided recommended search constraints is received. At block 716, search results are generated based on the selected one or more search constraints. In some embodiments, the search results are further based on a weight associated with each selected search constraint. Process 700 may terminate and/or return a calling process.

Figure 8:
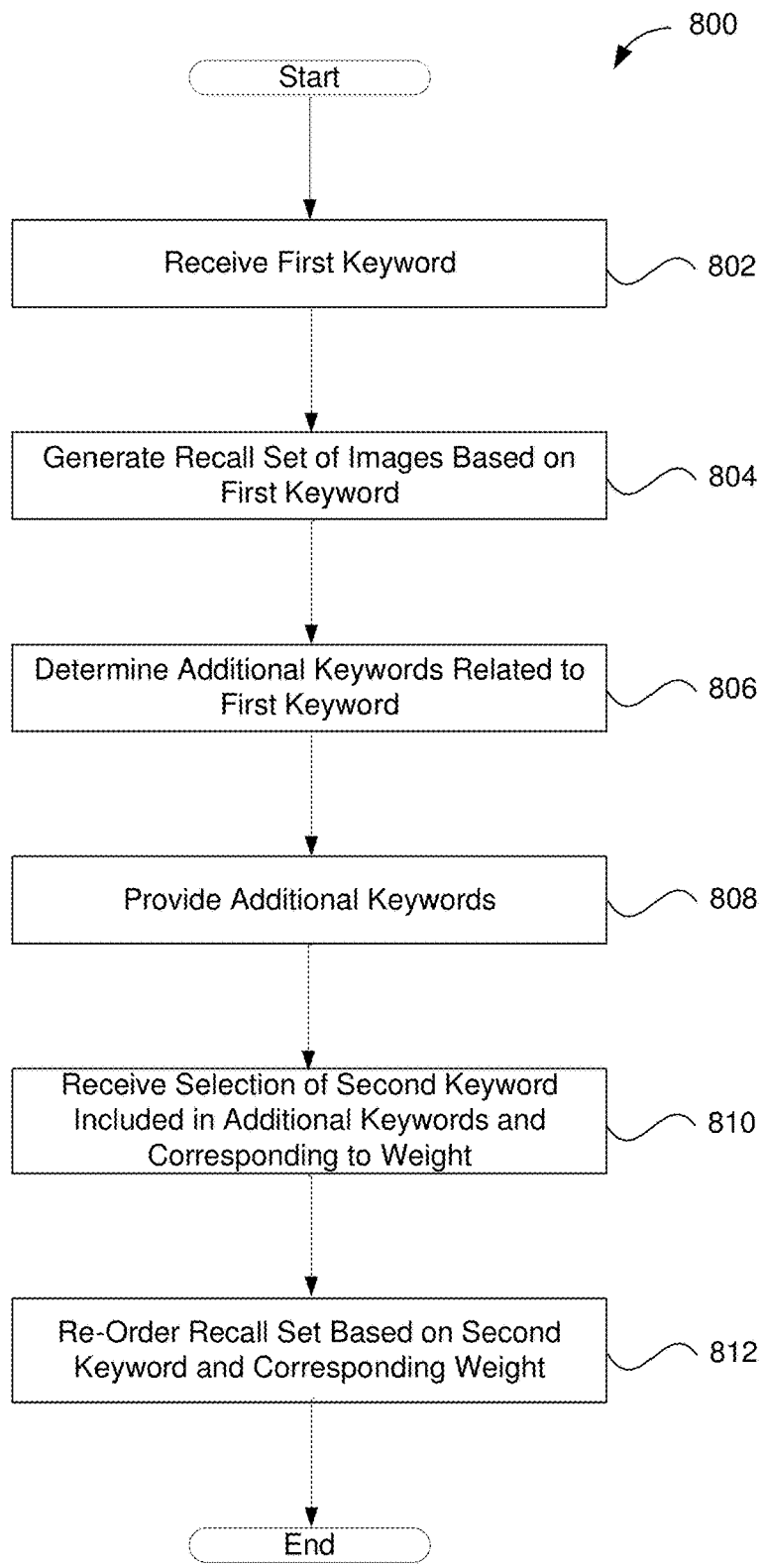
FIG. 8 illustrates one embodiment of an enhanced process flow for searching images that is consistent with the various embodiments presented herein.

FIG. 8 illustrates one embodiment of an enhanced process flow for searching images that is consistent with the various embodiments presented herein. Process 800 begins, after a start block, at block 802, where a first keyword is received. The first keyword may be received as a keyword search constraint as a search engine, such as but not limited to search engine 350 of FIG. 3C. As shown in UI 100 of FIG. 1, the keyword search constraint "baby" 112 may be received. In at least one embodiment, a first weight value, associated with the first keyword, is also received at block 802. At block 804, a recall set of images is generated and/or determined based on the first keyword. A recall set component, such as but not limited to recall set component 372 of search engine 350 may be employed to generate the recall set. The recall set may be provided to the user as initial search results.

At block 806, additional keywords are determined based on the first keyword. The additional keywords are statistically associated with the first keyword. A keyword analyzer, such as but not limited to keyword analyzer 384 of FIG. 3C may generate and/or determine the additional keywords statistically associated with the first keyword. At block 808, the additional keywords are provided to the user. For instance, the additional keywords may be provided as recommended search capsules 120 of FIG. 1.

At block 810, a selection of a second keyword included in the additional keywords and a corresponding second weight are received. For instance, the user may select, via a mouse click or hover, or a fingertip touch or tap, the recommended keyword search constraint "child" 122 of the recommended search capsules 120. The selected keyword may be received at a search engine, such as but not limited to search engine 350 of FIG. 3C. The corresponding weight may be set via a slider mechanism or a text box in UI 100. The selected keyword and corresponding weight may be added to the search constraint set, e.g., the set of search capsules 110 of UI 100.

At block 812, the recall set is re-ordered and/or re-ranked based on the first keyword, the first weight, the second keyword, and the second weight corresponding to the second keyword. Various embodiments for re-ordering and/or re-ranking a content set may be employed, such as those discussed throughout. A prioritization component, such as but not limited to prioritization component 374 may be employed to re-order the recall set. The re-ordered recall set may be provided to the user as updated search results. For instance, the updated search results may be provided via search results box 130 of UI 100. Process 800 may terminate and/or return a calling process.

Additional Embodiments

Although various embodiments have been described throughout, additional embodiments are disclosed in this section. One embodiment is directed towards a method for searching digital content, such as but not limited to digital images. The method includes receiving, from a user, a base search constraint for the content. The base search constraint may be, but need not be, an image similarity search constraint. Thus, the base constraint may include an example or sample image. A plurality of recommended search constraints may be determined and/or generated and provided to the user. At least some of the plurality of recommended search constraints may be statistically associated with and/or related to the base search constraint. For instance, if the base search constraint includes the keyword "infant," the recommended search constraints may include statistically associated keywords, such as but not limited to "infant," "diaper," "happy," and "crying." It should be understood that the base search constraint is not limited to keyword base constraints, nor are the recommended search constraints limited to keyword base constraints. For instance, the base search constraint may include a value indicating a color, an example digital image for a image similarity type search, or a value indicating an image aesthetic. The method may receive, from the user, a selection of a first search constraint included in the plurality of recommend search constraints. For example, the user may select the recommended keyword "diaper." The method generates and provides search results to the user. The search results are based on a search constraint set that includes both the base search constraint and the selected first search constraint. For instance, the method may provide search results that include a plurality of images depicting babies wearing diapers.

In some embodiments, the method further includes generating and/or determining recall set of the content based on the base search constraint and updating the recall set based on the first search constraint. For instance, the recall set may be initial or preliminary search results, and the preliminary search results are re-ordered and/or re-ranked based on the received first search constraint. In some embodiments, updating the recall set may be based on a weight associated with the base search constraint and another weight associated with the first search constraint. The search results that are provided to the user are based on the updated recall set.

In various embodiments, the weight associated with the first search constraint is received from the user. In other embodiments, the weight associated with the base search constraint may be a default or maximum weight. The user may or may not be enabled to modify the weight associated with the base search constraint. The recall set may be ordered based on the base search constraint, the weight associated with the base search constraint, the first search constraint, and the weight associated with the first search constraint. The search results provided to the user are based on the order of the recall set.

In at least one embodiment, a selection of a first image is received from the user. The first image may be included in the search results or the user may alternatively provide the first image via other means. A value indicating an aspect of the first image is determined. At least one of the recommended search constraints is based on the value indicating the aspect of the first image. The aspect of the first image may be a color depicted in the first image, content (such as but not limited to tangible objects such as persons, physical objects, locations, and the like), or an aesthetic quality of the image. Such image aesthetics qualities may include one or more of the hue, saturation, lightness, intensity, quantity, color harmony, depth of field, interesting content, interesting lighting, motion blur, out-of-focus blur (e.g., image bokeh), object emphasis, quality, or repetition of the first image.

Another method for searching digital images includes steps for receiving a selection of a digital image. For instance, a user may employ a user interface (UI), such as but not limited to UI 100 of FIG. 1 to select an image included in search results and/or provide an image through a button included in the UI. The method also includes steps for providing a value indicating an aspect of the digital image. For instance, the method may employ the UI to provide a numerical, textual, and/or other value to the user that indicates at least one of content depicted within the image, color depicted within the image, or an aesthetic quality of the image. The provided value may be a recommended search constraint. The value may be provided via one or more drop-down menus included in the UI. The method also includes receiving a selection of the value. For example, the user may select the value via a mouse click, hovering a cursor or fingertip over the value displayed in a drop down menu, or other such selection mechanism. The method also includes providing search results that include a plurality of additional images. At least a portion of the images included in the search results have a corresponding aspect indicated by the selected value. That is, the search result images have at least a similar aspect as to the selected aspect of the digital image.

The method further includes steps for receiving a selection of the aspect of the digital image. For instance, the user may employ a menu included in the UI, such as but not limited to drop-down menus, to select whether they want to target the search towards content that is similar to the content depicted within the image, similar colors to those depicted within the image, and/or similar image aesthetics to those of the selected image. Such image aesthetics may include one or more of the hue, saturation, lightness, intensity, quantity, color harmony, depth of field, interesting content, interesting lighting, motion blur, out-of-focus blur (e.g., image bokeh), object emphasis, quality, or repetition of the first image. The method may further include steps for accessing the value based on the selected aspect. For instance, the method may access the method from a database. In other embodiments, the method may access the value by determining the value for the aspect. An image classifier, such as but not limited to content classifier 222 of FIG. 2 and/or image classifier 300 of FIG. 3 may be employed to determine the value for the aspect of the selected image. The method also includes additional steps for accessing additional values for corresponding aspects of additional images, via the database and/or an image classifier.

The method may automatically determine a plurality of keywords. Each of the keywords being statistically associated with and/or related to content depicted within the selected digital image. The keywords may be provided to the user as recommended search constraints. The user may employ the UI to select a first keyword included in the plurality of keywords. The search results are updated based on the selected keyword. The user may additional provide a weight associated with the keyword. The updated results may be further based on the weight associated with the selected keyword.

The method may further includes steps for receiving a selection of a second digital image and steps for providing a second value indicating a second aspect of the digital image. The method may also include steps for receiving a selection of the second value for the second aspect of the second digital image, as well as a second weight associated with the second value. The method further includes steps determining an order of the search results based on the value for the aspect of the digital image, a first weight associated with the value, the second value for the second aspect of the second digital image, and the second weight associated with the second value.

The method may further include receiving an indication of an approximate position within the digital image. The method also generates the search results such that at least a portion of the plurality of additional digital images depict content that is located within a position corresponding to the approximate position within the digital image. In other embodiments, the method generates the search results such that at least a portion of the plurality of additional digital images depict content that is located outside or not within the position corresponding to the approximate position within the digital image.

Still another method includes receiving at least one of a first keyword of a first image. Search results may be provide based on the first keyword or the first image. For instance, an image similarity search may be performed, wherein the first image serves as the example image. Search results are returned that include a plurality of additional images that are each at least similar to the first image. In embodiments where a first keyword is received, the search results include images that depict content associated with the first keyword.

A plurality of keywords may be determined. Each of the determined additional keywords is statistically associated with or related to the first keyword or the first image. The additional keywords may indicate persons, objects, locations, or scenes depicted within the example image. The additional keywords are provided, for instance via the UI. A selection of a second keyword included in the additional keywords is received. A numerical weight value corresponding to the second keyword is also received. The search results are updated based on the second keyword and the numerical weight corresponding to the second keyword. For example, the search results may be re-ordered and/or re-ranked. The updated search results are provided to the user.

The method may further determine dominant colors depicted in the first image and provide visual indicators of the dominant colors. A selection of a visual indicator may be received, along with a second corresponding numerical weight value. The selected visual indicator corresponds to a first color of the dominant colors. The search results may be updated based on the first color and the corresponding numerical weight value.

The method may further include receiving an indication of a first location within the first image. The method updates the search results such that content depicted in at least a portion of the plurality of additional images is positioned in locations outside a location corresponding to the first location within the first image. In other embodiments, the method updates the search results such that content depicted in at least a portion of the plurality of additional images is positioned within in locations corresponding to the first location within the first image.

In at least one embodiment, the method determines values for various aesthetic qualities of the first image. Visual indicators of the values are provided. A selection of a visual indicator corresponding to a first value of the one or more values is received. A corresponding second weight may also be received. The search results are updated based on the first value and the second numerical weight corresponding to the first value.

Illustrative Computing Device

Figure 9:
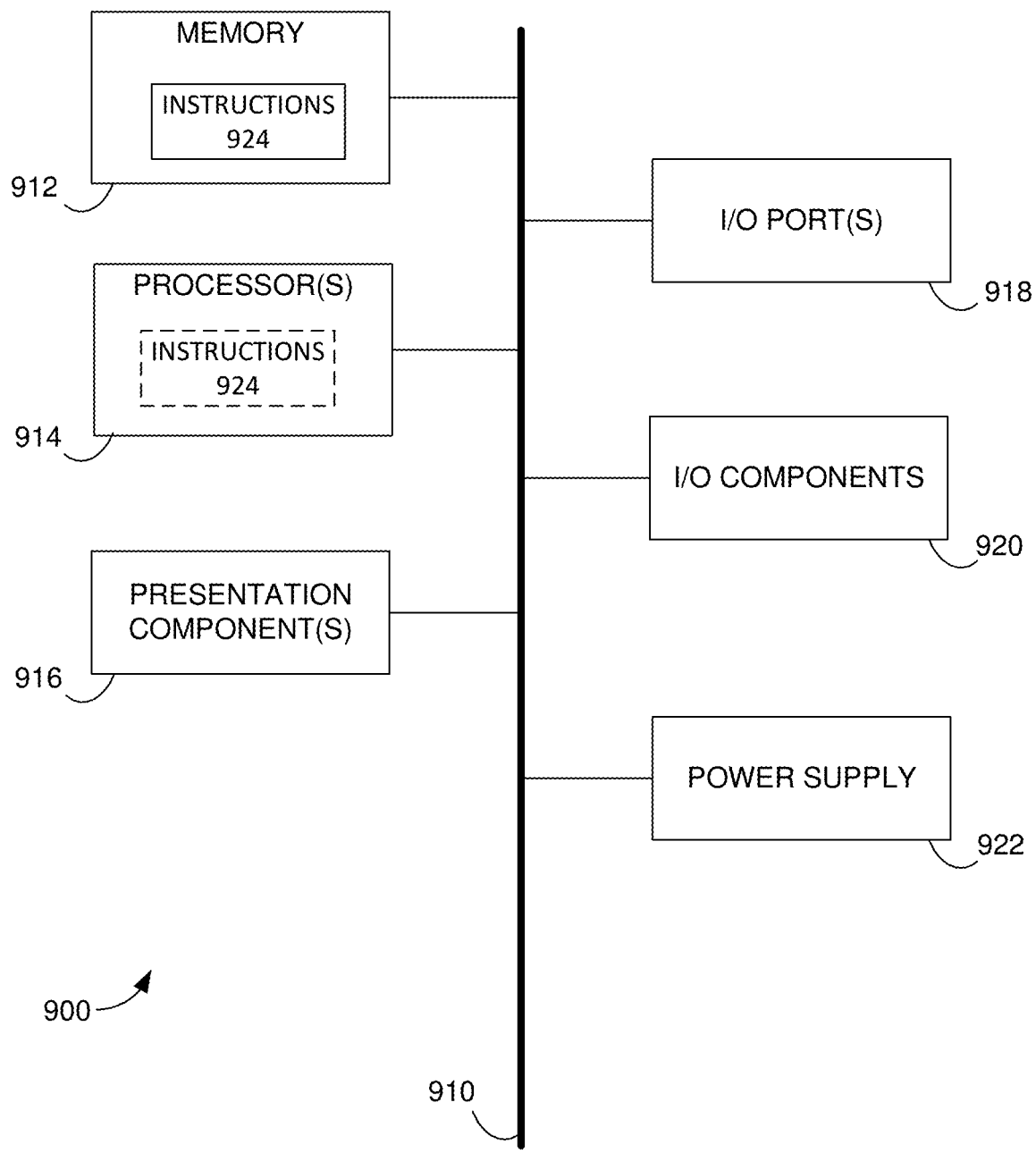
FIG. 9 is a block diagram of an example computing device in which embodiments of the present disclosure may be employed.

Having described embodiments of the present invention, an example operating environment in which embodiments of the present invention may be implemented is described below in order to provide a general context for various aspects of the present invention. Referring to FIG. 9, an illustrative operating environment for implementing embodiments of the present invention is shown and designated generally as computing device 900. Computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 9, computing device 900 includes a bus 910 that directly or indirectly couples the following devices: memory 912, one or more processors 914, one or more presentation components 916, input/output ports 918, input/output components 920, and an illustrative power supply 922. Bus 910 represents what may be one or more busses (such as an address bus, data bus, or combination thereof). Although the various blocks of FIG. 9 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 9 is merely illustrative of an example computing device that can be used in connection with one or more embodiments of the present disclosure. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. Memory 912 may be non-transitory memory. As depicted, memory 912 includes instructions 924. Instructions 924, when executed by processor(s) 914 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 900 includes one or more processors that read data from various entities such as memory 912 or I/O components 920. Presentation component(s) 916 present data indications to a user or other device. Illustrative presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A non-transitory computer-readable storage medium having instructions stored thereon for searching content, which, when executed by a processor of a computing device cause the computing device to perform actions comprising:

receiving, based on a user selection-, a base search constraint for the content, wherein the base search constraint comprises a first image;

extracting or generating a plurality of metadata indicating aspects of the first image, wherein a first vector in a first position in a vector space represents the first image, and wherein components of the first vector correspond to the aspects of the first image;

determining a relevancy score for each of a plurality of textual search constraints using a distance metric based on a comparison of the first position of the first vector in the vector space to each of a plurality of additional positions in the vector space, wherein the plurality of additional positions in the vector space represent each of the plurality of textual search constraints, and wherein the vector space includes multiple dimensions and a determination of the distance metric is isolated, based on an additional search constraint indicating one or more similarity dimensions, to a portion of the dimensions of the vector space associated with similarity;

providing, for display, a plurality of recommended textual search constraints from the plurality of textual search constraints based on the relevancy scores for each of the plurality of textual search constraints;

receiving a user selection of a first textual search constraint included in the plurality of recommended textual search constraints; and providing, for display, search results of the content based on a search constraint set that includes at least the first textual search constraint and the base textual search constraint.

2. The non-transitory computer-readable storage medium of claim 1, wherein the aspects include at least a color aspect.

3. The non-transitory computer-readable storage medium of claim 1, wherein the actions further comprise:

generating a recall set of the content based on a second textual search constraint;

updating the recall set of the content based on the second textual search constraint; and generating the search results based on the updated recall set of the content.

4. The non-transitory computer-readable storage medium of claim 3, wherein the actions further comprise:

receiving, from the user, a weight associated with the first textual search constraint;

updating an order of the recall set of the content based on the first textual search constraint and the weight associated with the first textual search constraint; and generating the search results, wherein the search results are further based on the updated order of the recall set of content.

5. The non-transitory computer-readable storage medium of claim 1, wherein the vector space includes multiple dimensions and the determination of the distance metric is isolated to a portion of the dimensions of the vector space associated with machine vision.

6. The non-transitory computer-readable storage media of claim 5, wherein the aesthetic qualities of the image include quality and repetition of the first image.

7. The non-transitory computer-readable storage media of claim 1, wherein the base search constraint includes at least one of an image similarity search constraint or an image aesthetic search constraint.

8. A method for searching images, comprising:
   steps for receiving a selection of a digital image;
   steps for receiving a first selection to add an image aesthetic search to an interface, and a second selection to add an image similarity search to the interface;
   steps for extracting or generating first metadata indicating first aspects of the digital image, wherein a first vector in a first position in a vector space represents the digital image, and wherein components of the first vector correspond to the aspects of the digital image;
   determining a relevancy score for each of a plurality of selectable search constraints using a distance metric based on a comparison of the first position of the first vector in the vector space to each of a plurality of additional positions in the vector space, wherein the plurality of additional positions in the vector space represent each of the plurality of selectable search constraints, and wherein the vector space includes multiple dimensions and a determination of the distance metric is isolated, based on an additional search constraint indicating one or more similarity dimensions, to a portion of the dimensions of the vector space associated with similarity;
   steps for providing, for presentation, based on the relevancy scores, a first selectable search constraint indicating a first aspect of the set of aspects of the digital image and a second selectable search constraint indicating a second aspect of the set of aspects of the digital image;
   steps for receiving a selection of the first selectable search constraint indicating the first aspect of the digital image;
   steps for providing, for presentation, in response to the first selection to add an image aesthetic search to an interface, a first selectable value indicating the first aspect of the digital image, wherein the first selectable value is based on a keyword statistically associated with a value for an aesthetic quality of the image; and
   steps for providing search results that include a plurality of additional digital images that each have a corresponding aspect indicated by the first selectable search constraint.

9. The method of claim 8, wherein the first aspect of the digital image includes at least one of a color depicted in the image, content depicted in the image, or an aesthetic quality of the image.

10. The method for claim 8, wherein the method further comprises:
    steps for accessing a first selectable value from a database based on the first aspect of the digital image; and
    steps for accessing additional selectable values from the database, wherein the accessed additional selectable values indicate corresponding values associated with the plurality of the additional digital images.

11. The method of claim 8, wherein the method further comprises:
    automatically determining a plurality keywords, wherein each of the plurality of keywords is statistically related to content depicted in the digital image;
    receiving a selection of a first keyword included in the plurality of keywords; and
    updating the search results based on selected first keyword.

12. The method of claim 8, wherein the method further comprises:
    steps for receiving a selection of the second selectable search constraint for the second aspect of the second digital image and a second weight associated with the second search constraint; and
    steps for determining an order of the search results based on the first selectable search constraint-value for the aspect of the digital image, a first weight associated with the first selectable search constraint, the second selectable search constraint of the second digital image, and the second weight associated with the second selectable search constraint.

13. The method of claim 8, wherein the first aspect of the digital image includes at least one of a motion blur, a bokeh, or a depth of field.

14. The method of claim 8, wherein the method further comprises:
    receiving an indication of an approximate position within the digital image; and
    generating the search results such that at least a portion of the plurality of additional digital images depict content that is located within a position corresponding to the approximate position within the digital image.

15. A computing system for searching digital content, comprising:
    a processor device; and a non-transitory computer-readable storage medium, coupled with the processor device, having instructions stored thereon, which, when executed by the processor device, provide the system with a search engine configured to perform actions comprising:
    receiving a first image;
    providing search results based on the first image, wherein the search results include a plurality of additional images;
    extracting or generating a plurality of metadata indicating aspects of the first image, wherein a first vector in a first position in a vector space represents the first image, and wherein components of the first vector correspond to the aspects of the first image;
    determining a relevancy score for each of a plurality of additional keywords using a distance metric based on a comparison of the first position of the first vector in the vector space to each of a plurality of additional positions in the vector space, wherein the plurality of additional positions in the vector space represent each of the plurality of additional keywords, and wherein the vector space includes multiple dimensions and a determination of the distance metric is isolated, based on an additional search constraint indicating one or more similarity dimensions, to a portion of the dimensions of the vector space associated with similarity;
    receiving a selection of a second keyword included in the plurality of additional keywords, wherein, upon selection, the second keyword is transferred from a recommended search capsule box to a set of search capsules;
    receiving a user-provided weight, at the set of search capsules, corresponding to the second keyword;

updating the search results based on the second keyword and the user-provided weight corresponding to the second keyword; and providing the updated search results.

16. The computing system of claim 15, the actions further comprising:

determining one or more colors depicted in the first image;

providing visual indicators of the one or more colors depicted in the first image;

receiving a selection of the visual indicator corresponding to a first color included in the one or more colors depicted in the first image and a second user-provided weight corresponding to first color; and updating the search results based on the first color and the second user-provided weight corresponding to the first color.

17. The computing system of claim 15, wherein at least a portion of the determined plurality of additional keywords indicates content depicted within the first image.

18. The computing system of claim 15, the actions further comprising:

receiving an indication of a first location within the first image; and further updating the search results such that content depicted in at least a portion of the plurality of additional images is positioned in a second location different from the first location.

19. The computing system of claim 15, the actions further comprising:

receiving an indication of a first location within the first image; and updating the search results such that content depicted in at least a portion of the plurality of additional images is positioned within in locations corresponding to the first location within the first image.

20. The computing system of claim 19, the actions further comprising:

determining one or more values for an aesthetic quality of the first image;

providing visual indicators of the one or more values for the aesthetic quality of the first image;

receiving a selection of the visual indicator corresponding to a first value included in the one or more values for the aesthetic quality of the first image and a second user-provided weight corresponding to first values; and updating the search results based on the first value and the second user-provided weight corresponding to the first value.

* * * * *

UNITED STATES PATENT AND TRADEMARK OFFICE
CERTIFICATE OF CORRECTION

PATENT NO. : 11,361,018 B2
APPLICATION NO. : 15/824907
DATED : June 14, 2022
INVENTOR(S) : Samarth Gulati et al.

It is certified that error appears in the above-identified patent and that said Letters Patent is hereby corrected as shown below:

In the Claims

Claim 1, Column 36, Line 42:
The line reading "textual search constraint and the base textual search" should read -- textual search constraint and the base search --.

Claim 6, Column 37, Line 3:
The line reading "The non-transitory computer-readable storage media of" should read -- The non-transitory computer-readable storage medium of --.

Claim 7, Column 37, Line 6:
The line reading "The non-transitory computer-readable storage media of" should read -- The non-transitory computer-readable storage medium of --.

Claim 8, Column 37, Line 17:
The line reading "first aspects of the digital image, wherein a first vector" should read -- aspects of the digital image, wherein a first vector --.

Claim 8, Column 37, Line 35 (Approx.):
The line reading "steps for providing; for presentation, based on the rel-" should read -- steps for providing for presentation, based on the rel- --.

Claim 10, Column 37, Line 58:
The line reading "The method for claim 8, wherein the method further" should read -- The method of claim 8, wherein the method further --.

Signed and Sealed this
Third Day of January, 2023

*Katherine Kelly Vidal*

Katherine Kelly Vidal
*Director of the United States Patent and Trademark Office*